(12) United States Patent
Legerton et al.

(10) Patent No.: US 11,533,443 B2
(45) Date of Patent: Dec. 20, 2022

(54) DISPLAY EYEWEAR WITH ADJUSTABLE CAMERA DIRECTION

(71) Applicant: Innovega, Inc., Bellevue, WA (US)

(72) Inventors: Jerome A. Legerton, Jupiter, FL (US); Jay Marsh, Bonsall, CA (US)

(73) Assignee: Innovega, Inc., Bellevue, WA (US)

( * ) Notice: Subject to any disclaimer, the term of this patent is extended or adjusted under 35 U.S.C. 154(b) by 0 days.

(21) Appl. No.: 16/915,985

(22) Filed: Jun. 29, 2020

(65) Prior Publication Data

US 2021/0409606 A1   Dec. 30, 2021

(51) Int. Cl.
| | |
|---|---|
| H04N 5/262 | (2006.01) |
| H04N 5/232 | (2006.01) |
| G02B 27/01 | (2006.01) |
| G02C 11/00 | (2006.01) |
| H04N 5/225 | (2006.01) |
| G06F 1/16 | (2006.01) |

(52) U.S. Cl.
CPC ....... *H04N 5/2628* (2013.01); *G02B 27/0172* (2013.01); *G02C 11/10* (2013.01); *H04N 5/2253* (2013.01); *H04N 5/23218* (2018.08); *H04N 5/23229* (2013.01); *H04N 5/23293* (2013.01); *H04N 5/23299* (2018.08); *G02B 2027/0178* (2013.01); *G06F 1/163* (2013.01)

(58) Field of Classification Search
CPC .. H04N 5/2251; H04N 5/2252; H04N 5/2253; H04N 5/2254; H04N 5/2257; H04N 5/2258; H04N 5/2259; H04N 5/23299; H04N 5/2628; G02C 11/10; G02B 27/01; G02B 27/017; G02B 27/0172; G02B 27/0176; G02B 2027/0138; G02B 2027/0178; G06F 1/163

See application file for complete search history.

(56) References Cited

U.S. PATENT DOCUMENTS

| | | | |
|---|---|---|---|
| 6,580,563 B1 | 6/2003 | Finney | |
| 9,304,332 B2 | 4/2016 | Fonte et al. | |
| 9,529,213 B2 | 12/2016 | Fonte et al. | |
| 9,703,123 B2 | 7/2017 | Fonte et al. | |
| 9,880,441 B1 | 1/2018 | Osterhout | |
| 10,031,350 B2 | 7/2018 | Fonte et al. | |
| 10,031,351 B2 | 7/2018 | Fonte et al. | |
| 10,222,635 B2 | 3/2019 | Fonte et al. | |
| 10,330,958 B2 | 6/2019 | Fonte et al. | |
| 10,451,900 B2 | 10/2019 | Fonte et al. | |
| 10,459,256 B2 | 10/2019 | Fonte et al. | |
| 10,495,885 B2 | 12/2019 | Hilkes | |
| 10,536,783 B2 | 1/2020 | Sanger et al. | |
| 10,698,236 B2 | 6/2020 | Fonte et al. | |

(Continued)

OTHER PUBLICATIONS

International Search Report and Written Opinion in PCT/US2021/038737, dated Sep. 30, 2021.

*Primary Examiner* — Twyler L Haskins
*Assistant Examiner* — Akshay Trehan

(57) ABSTRACT

Some embodiments provide display eyewear with adjustable camera direction. In general, one aspect disclosed features an electronic device, comprising: a structure configured to be worn on the head of a user; a camera movably coupled to the structure and arranged to capture images in a field of view of the user; and a display panel fixedly coupled to the structure and arranged to display, to the user, the images captured by the camera.

15 Claims, 19 Drawing Sheets

(56) References Cited

U.S. PATENT DOCUMENTS

| | | |
|---|---|---|
| 10,777,018 B2 | 9/2020 | Varady et al. |
| 2006/0098087 A1 | 5/2006 | Brandt et al. |
| 2012/0075168 A1 | 3/2012 | Osterhout et al. |
| 2014/0063055 A1* | 3/2014 | Osterhout ............. G06T 19/006 345/633 |
| 2016/0282628 A1 | 9/2016 | Hilkes |
| 2017/0068119 A1* | 3/2017 | Antaki .................... G06F 3/012 |
| 2017/0269385 A1 | 9/2017 | Fonte et al. |
| 2018/0205932 A1 | 7/2018 | Yu |
| 2018/0227470 A1* | 8/2018 | Rönngren .......... G02B 27/0093 |
| 2018/0336737 A1 | 11/2018 | Varady et al. |
| 2018/0348529 A1 | 12/2018 | Blum et al. |
| 2019/0179409 A1* | 6/2019 | Jones ...................... G06F 3/011 |
| 2020/0285081 A1 | 9/2020 | Fonte et al. |
| 2020/0322547 A1 | 10/2020 | Marechal et al. |
| 2020/0410775 A1 | 12/2020 | Varady et al. |

\* cited by examiner

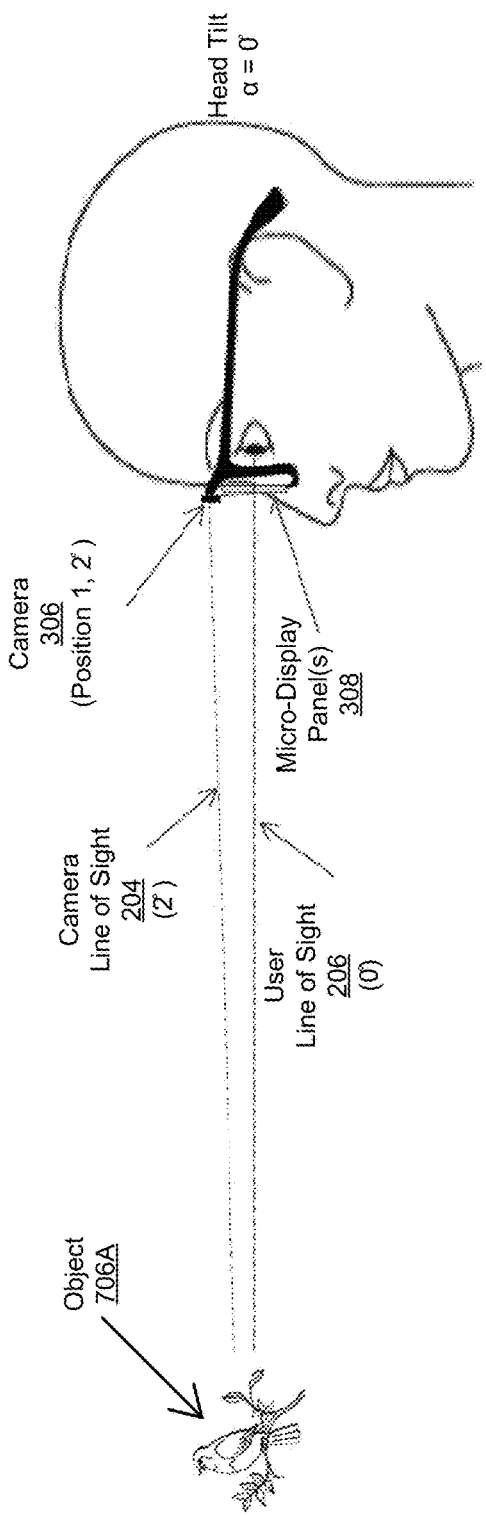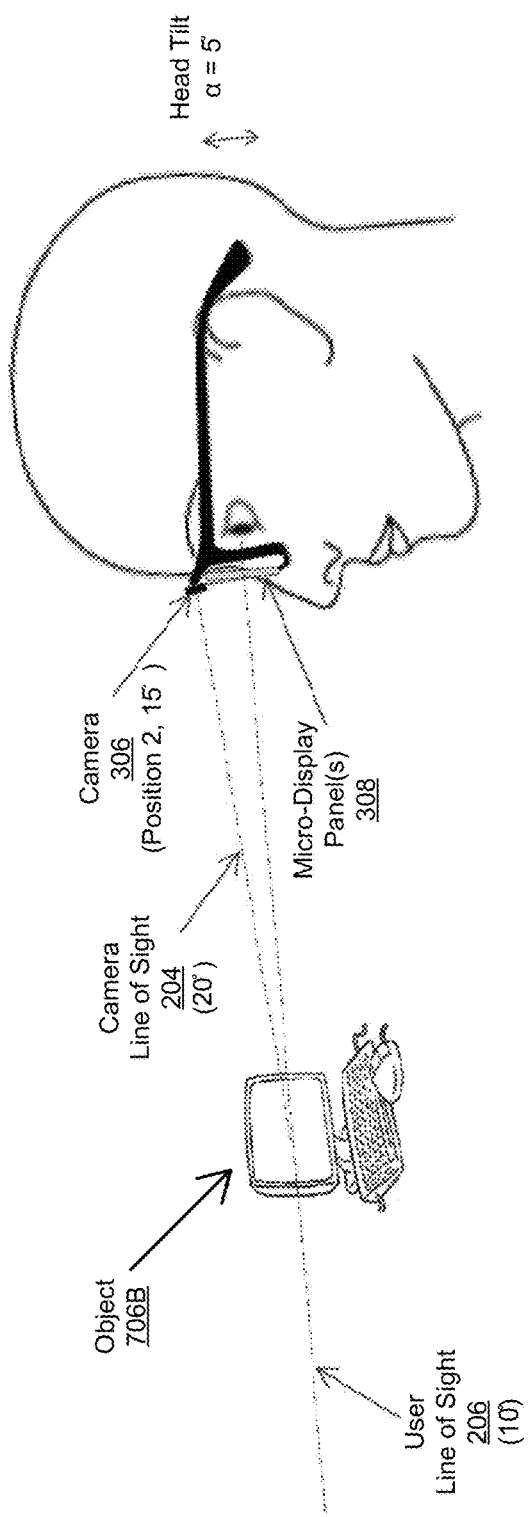
FIG. 7A
FIG. 7B

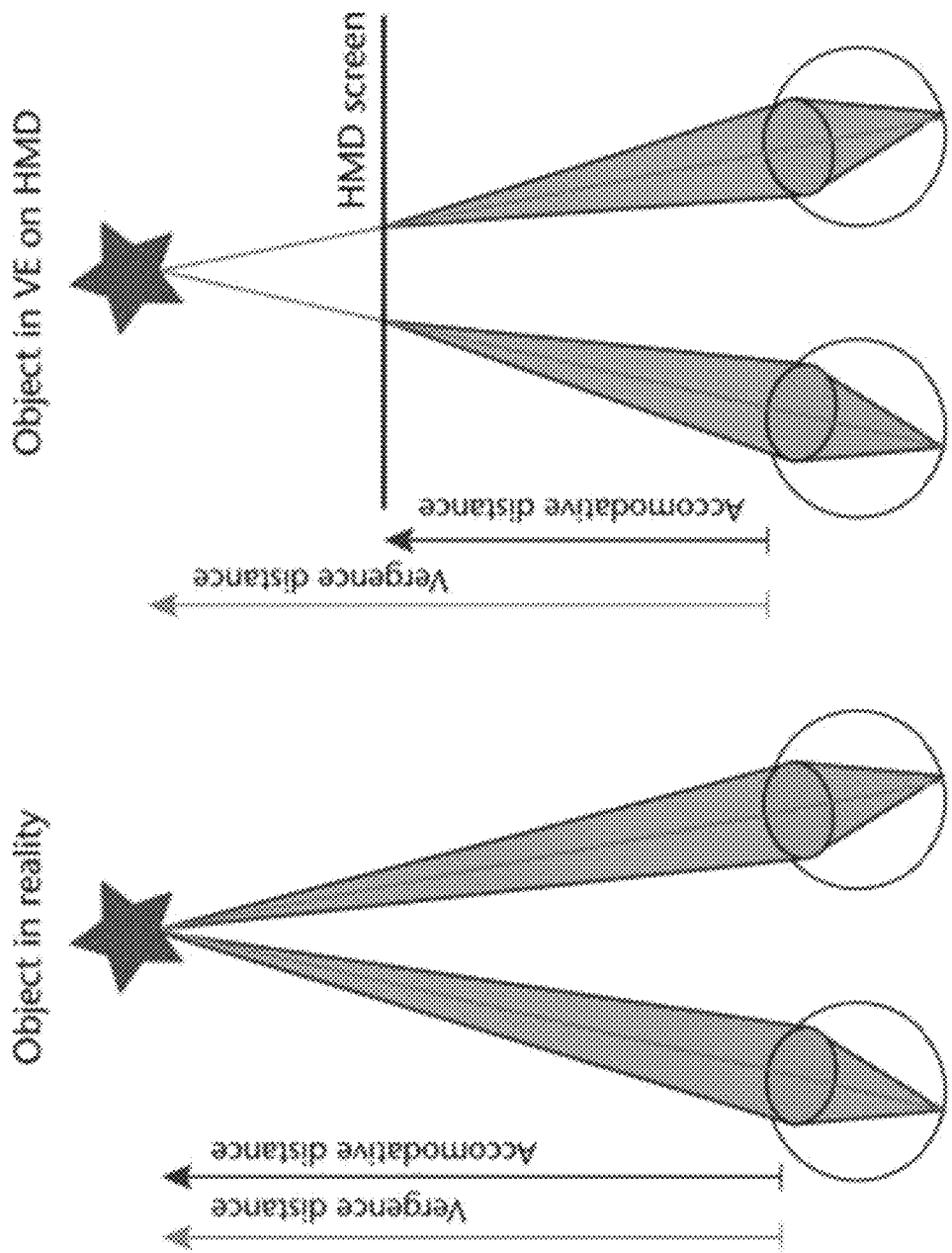

DISPLAY EYEWEAR WITH ADJUSTABLE CAMERA DIRECTION

DESCRIPTION OF RELATED ART

The disclosed technology relates generally to eyewear, and more particularly some embodiments relate to display eyewear.

SUMMARY

In general, one aspect disclosed features an electronic device, comprising: a structure configured to be worn on the head of a user; a camera movably coupled to the structure and arranged to capture images in a field of view of the user; and a display panel fixedly coupled to the structure and arranged to display, to the user, the images captured by the camera.

Embodiments of the electronic device may include one or more of the following features. Some embodiments comprise camera to tilt horizontally and vertically relative to a resting line of sight of the user. In some embodiments, the gimbal is configured to move the camera such that an angular position of the camera has a magnitude of up to 90° in any semi-meridian relative to a normal from a front of the structure. Some embodiments comprise a motor configured to control the gimbal. Some embodiments comprise a controller configured to control the motor based on a control signal, wherein the control signal is provided by at least one of: a tilt sensor configured to sense a tilt of the structure, wherein the control signal is based on the tilt, and a distance sensor configured to sense a distance to an object, wherein the control signal is based on the distance. In some embodiments, the structure comprises at least one of: a frame configured to be worn on the head of a user, the frame including a nose rest configured to rest on the nose of the user, and an ear rest configured to rest on an ear of the user; and a frame front. In some embodiments, the display panel is occluded or transparent. In some embodiments, the display panel is disposed within a resting line of sight of the user. In some embodiments, a field of view displayed by the display panel is smaller than a field of view captured by the camera; and the controller is further configured to shift a portion of the captured images from outside the field of view of the display to within the field of view of the display. In some embodiments, an angle of the shift exceeds 10°. In some embodiments, an angle of the shift is a fixed angle. Some embodiments comprise a user input device, wherein an angle of the shift is determined by inputs received by the user input device. In some embodiments, the controller is further configured to shift a portion of the captured images prior to displaying the captured images. In some embodiments, the structure further comprises: a lens disposed in a line of sight of an eye of the user. In some embodiments, the structure comprises: a pair of eyeglasses.

In general, one aspect disclosed features a method for an electronic device configured to be worn on the head of a user, the method comprising: capturing images in a field of view of the user using a camera movably coupled to the electronic device; displaying the images to the user on a display panel fixedly coupled to the electronic device; controlling a direction of the camera based on at least one of: a tilt of the electronic device, and a distance from the camera to an object in the field of view of the user.

Embodiments of the method may include one or more of the following features. In some embodiments, the camera is disposed above a resting line of sight of the user, and wherein controlling the camera comprises: causing a line of sight of the camera to intersect a resting line of sight of the user at the object based on the distance to the object. In some embodiments, the camera is disposed above a resting line of sight of the user, and wherein controlling the camera comprises: causing an angle between a line of sight of the camera and a resting line of sight of the user to increase with increasing tilt.

In general, one aspect disclosed features an electronic device, comprising: a structure configured to be worn on the head of a user; a camera fixedly coupled to the structure and arranged to capture images in a field of view of the user; and a display panel fixedly coupled to the structure above a resting line of sight of the user and arranged to display, to the user, the images captured by the camera.

In general, one aspect disclosed features a method for an electronic device configured to be worn on the head of a user, the method comprising: capturing images in front of the user using a camera of the electronic device; electronically shifting a portion of the captured images; and displaying the shifted images to the user on a display panel of the electronic device.

Embodiments of the method may include one or more of the following features. Some embodiments comprise electronically shifting the portion of the captured images based on a vergence distance between an eye of the user and an object in the captured images.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIGS. 7A through 7C illustrate a use case for immersive display eyewear controlling movement of the camera based on head tilt according to embodiments of the disclosed technology.

FIGS. 13A and 13B show the difference in viewing paradigms between normal viewing of an object in reality (FIG. 13A), and when viewing a virtual environment on a head-mounted display (FIG. 13B).

Figure 1:
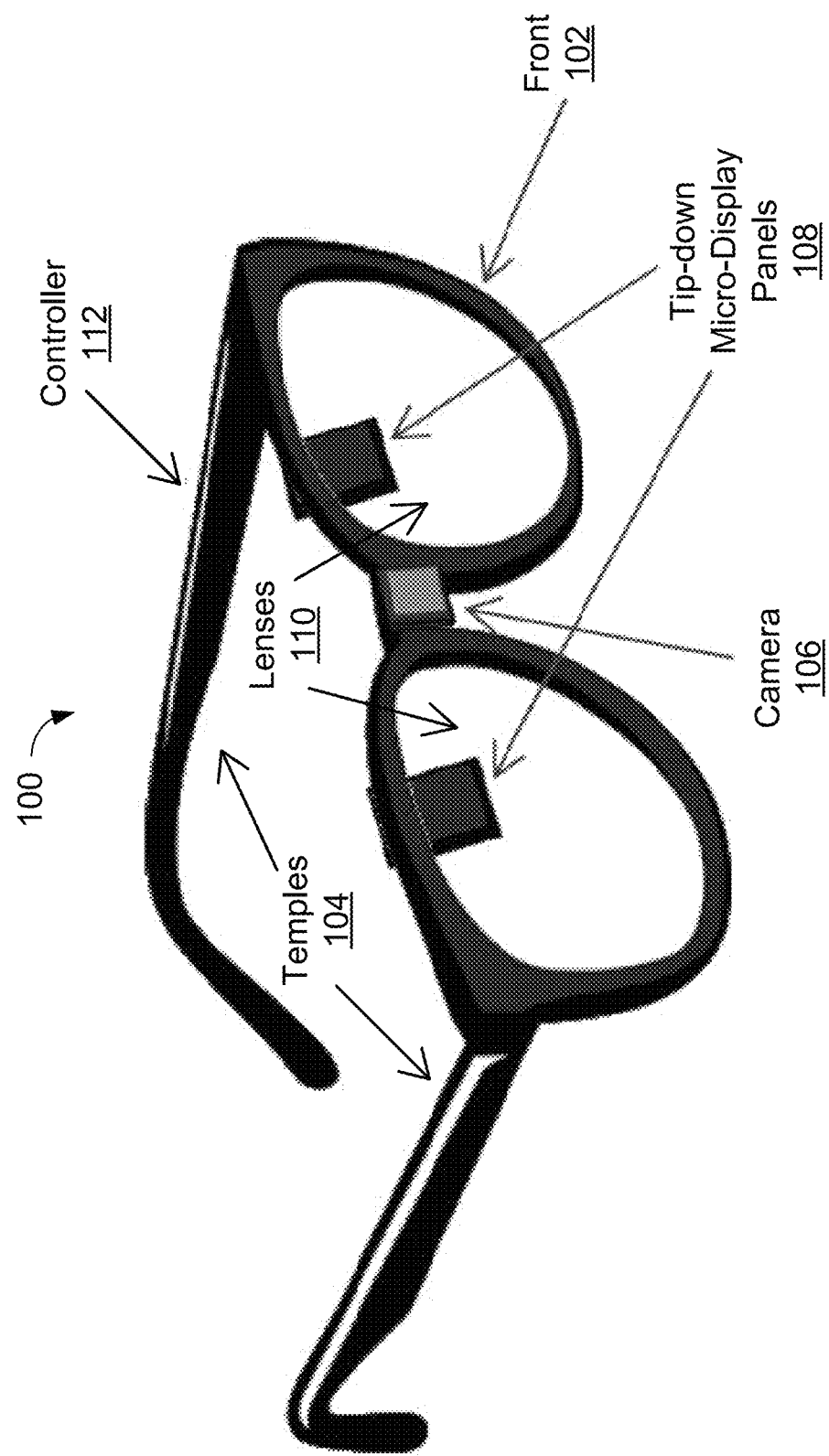
FIG. 1 illustrates tip-down display eyewear according to some embodiments of the disclosed technology.

The figures are not exhaustive and do not limit the present disclosure to the precise form disclosed.

DETAILED DESCRIPTION

Display eyewear are utilized for a plurality of applications. Conventional display eyewear generally have an outward facing camera for some applications. However, conventional display eyewear implementations suffer from a number of shortcomings.

In some implementations, the camera can be used as a feed source for the display in the eyewear that is viewed by the user, either contemporaneously with the image capture of the camera, or at a later time. It is common practice to embed and fix the camera in the display eyewear such that the camera angle is respective to the angle of the eyewear frame or headset as it rests on the face. In some implementations, the entire front of the frame or headset is hinged at side-attachments or earpieces such that the camera angle can be manually adjusted. In such implementations, the display angle made by the line of sight and the vertical plane of the display changes simultaneously with an angular change of the front of the display frame or headset. This simultaneous change with a fixed camera angle can result in a loss of the ability to view the display when attempting to point the camera at an object of regard, or can result in an inability to point the camera at the object of regard while viewing the display.

Furthermore, the geometric anthropomorphic diversity of human head shapes and eye positions results in a range of display positions relative to the user's resting line of sight, that is, the line of sight with a comfortable head tilt and the eyes at rest. The tilt of the display eyewear front varies with the shape of the resting position of the display eyewear on the users' nose bridge, and the height and position of the users' ears. The distribution of positions of the camera and the display results in a variation of performance when a camera is fixed in the display eyewear relative to the position of the display and relative to the line of sight.

Embodiments of the disclosed technology address these and other shortcomings of conventional implementations. In some embodiments, performance is enhanced by providing the ability to modulate the camera angle relative to the eyewear front angle and/or the display angle relative to the user's line of sight.

Some embodiments may provide virtual reality image enhancement for the visually impaired. In such embodiments, the user may sight the object of regard with the camera while simultaneously viewing an enhanced image in the display eyewear. The object of regard may be a target positioned a long distance from the user. The display may be mounted above the line of sight and accessed by an angular tip down of the head. In these embodiments, the camera may be angled upward about the same number of degrees that the head is tipped down to see the content in the display.

In some embodiments, the camera may be movable, and may be controlled according to a tilt of the user's head, a distance to an object, and the like. For example, a user may desire to view an object or task content at a great distance, where the object is positioned near the user's resting line of sight. In this example, the camera angle may be declined by a small number of degrees to allow the user a comfortable head position to view the intermediate distance object with the camera. In another example, the user may desire to view an object or task content at an intermediate distance, where the object is positioned somewhat below the user's resting line of sight. In this example, the camera angle may be declined by a greater number of degrees to allow the user a comfortable head position to view the intermediate distance object with the camera. The same user may wish to view a hand-held object at even a lower angle relative to the resting line of sight. In this example, the camera angle may be declined an even greater angle for comfortable viewing.

In some embodiments, the display eyewear may include a wide angle imaging camera and electronic means of shifting the image in the display, for example when the camera image does not align with the center of the display. In such embodiments, the image shift allows for a fixed camera position, and shifting a region of pixels to intersect the line of sight on the display. The image shift allows for a resting head position and resting line of sight when viewing the display content, and freedom from use of a hinged frame front or an adjustable camera angle. Such image shifting is also useful to bring scene content into view on a display that is otherwise not visible in the presence of field defects like hemianopsia where half of the visual field is blind.

FIG. 1 illustrates tip-down display eyewear 100 according to some embodiments of the disclosed technology. Referring to FIG. 1, the tip-down display eyewear 100 may be implemented using a pair of eyeglasses. The eyeglasses may include a front 102, one or more temples 104, and one or more lenses 110. The front 102 may rest upon the bridge of the nose of a user. Each temple 104 may rest upon an ear of the user. But while the described embodiment is implemented using a pair of eyeglasses, it should be understood that other embodiments may be implemented using any structure that can be worn on the head of the user. For example, such structures may include headbands, hats, masks, and the like.

The tip-down display eyewear 100 may include one or more outward-facing cameras 106. In the embodiment of FIG. 1, a camera 106 is mounted on a nose piece of the front 102. However, cameras may be mounted on other portions of the eyewear 100 in addition to, or instead of, this location. The camera 106 may be implemented as a digital camera, or the like. However, any sort of camera capable of performing the functions described herein may be used. In some embodiments, the camera 106 may be fixedly coupled to the front 102, such that a line of sight of the camera 106 is determined by the attitude of the front 102. In other embodiments, the camera may be movably coupled to the front 102.

The tip-down display eyewear 100 may include one or more tip-down micro-display panels 108. In the embodiment of FIG. 1, a tip-down micro-display panel 108 is disposed above the resting line of sight of each eye of the user. Each tip-down micro-display panel 108 may be implemented as a digital display panel, for example such as an LCD, LCOS, or OLED display panel. However, any sort of display panel capable of performing the functions described herein may be used. The tip-down micro-display panels 108 may be transparent or occluded. In some embodiments, the tip-down display eyewear 100 may include a user interface that allows the user to transition the tip-down micro-display panels 108 between transparent and occluded states. In some embodiments, the tip-down micro-display panels 108 may be fixedly coupled to the front 102.

In some embodiments, the tip-down display eyewear 100 may include a controller 112. The controller 112 may receive images captured by the camera 106, and may provide these images to the tip-down micro-display panels 108. The controller 112 may process the captured images prior to providing the processed images to the tip-down micro-display panels 108. For example, the controller 112 may magnify, brighten, or otherwise enhance the images. In embodiments having a movable camera 106, the controller 112 may control the movement of the movable camera 106. Some embodiments may comprise one or more sensors such as tilt sensors, distance sensors, and the like. In such embodiments, the controller 112 may control the movement of the movable camera 106 in accordance with signals received from the sensors, for example as described in detail below. The controller 112 may be located within one of the temples 104, and/or within some other portion of the tip-down display eyewear 100 or may be tethered to the tip-down display eyewear with wire or wirelessly.

It should be appreciated that the embodiments of FIG. 1 may be used, wholly or partially, in conjunction with other embodiments described herein.

Figure 2A:
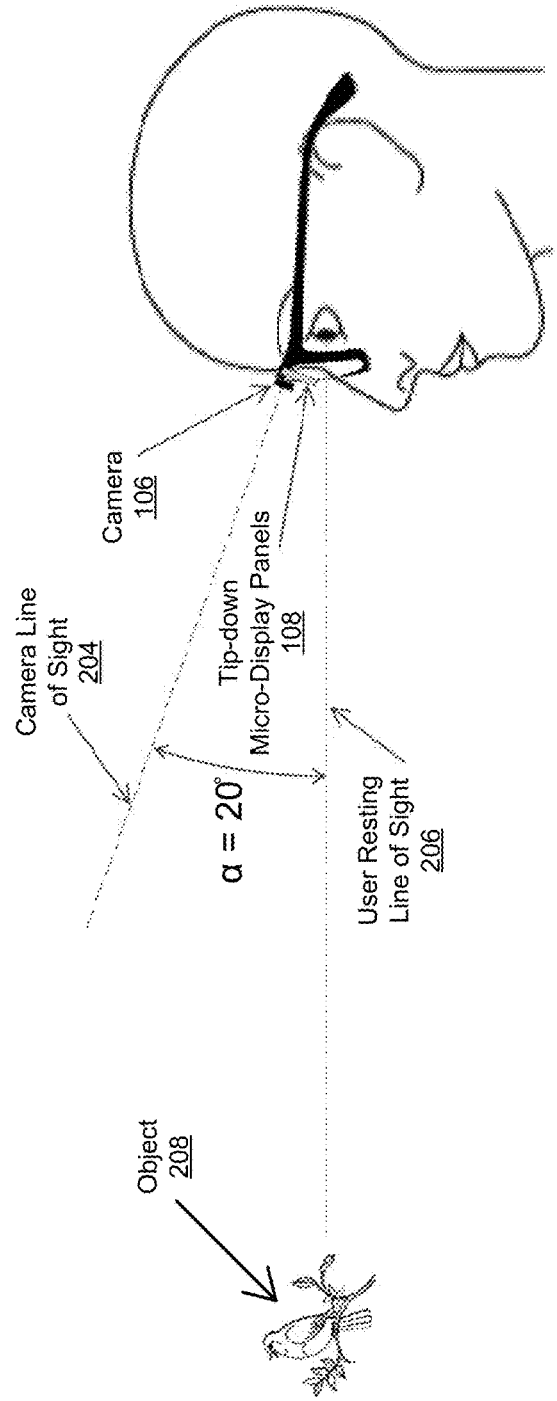
FIGS. 2A and 2B illustrates a use case for tip-down display eyewear according to embodiments of the disclosed technology.
Figure 2B:
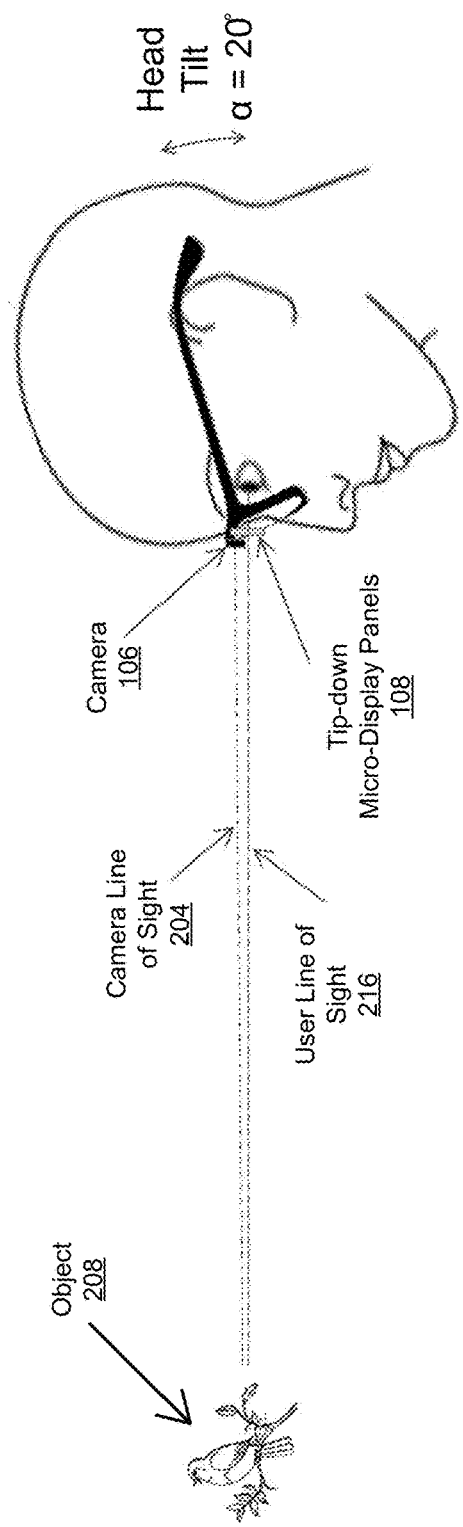

FIGS. 2A and 2B illustrates a use case for tip-down display eyewear according to embodiments of the disclosed technology. For clarity, this use case is described with reference to the tip-down display eyewear 100 of FIG. 1. However, it should be understood that this use case applies to other embodiments as well. Referring to FIG. 2A, a user employs the eyewear 100 with a resting head angle and a resting line of sight 206 to view an object 208, such as a bird perched upon a branch. In this example, the camera 106 is angled upward at 20°. That is, an angle α between the camera line of sight 204 and the user resting line of sight 206 is α=20°. And as described above, the tip-down micro-display panels 108 may be mounted above the user resting line of sight 206, such that the user's view of the object 208 is unobstructed. While certain numerical angles are mentioned, it should be understood that these are presented by way of example not limitation.

The user may employ the tip-down display eyewear 100 by simply tilting the user's head downward. In the example of FIG. 2B, by tilting the user's head downward at an angle of α=20°, the user aims the camera 106 at the object 208, while also bringing the tip-down micro-display panels 108 into the user line of sight 216. At this angle, the camera 106 captures an image of the object, which is displayed on the tip-down micro-display panels 108 for the user. One advantage of the tip-down display eyewear 100 is that it allows the user to continue to gaze at the object 208 while bringing the displayed image into the user's line of sight 216. This advantage allows the user to aim the camera, and acquire the image of the object 208, in an intuitive and seamless manner.

Figure 3:
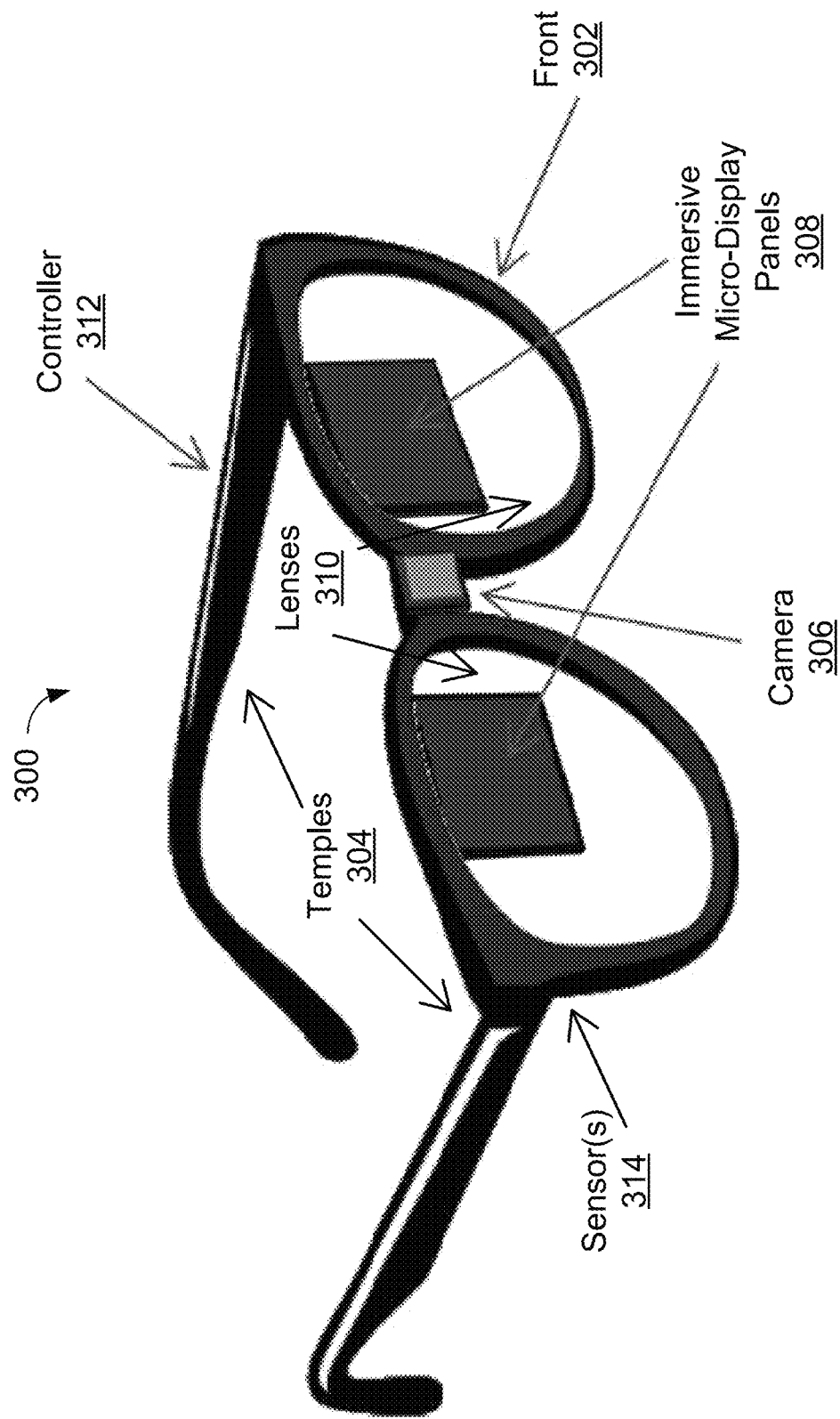
FIG. 3 illustrates immersive display eyewear according to some embodiments of the disclosed technology.

FIG. 3 illustrates immersive display eyewear 300 according to some embodiments of the disclosed technology. Referring to FIG. 3, the immersive display eyewear 300 may be implemented using a pair of eyeglasses. The eyeglasses may include a front 302, one or more temples 304, and one or more lenses 310. The front 302 may rest upon the bridge of the nose of a user. Each temple 304 may rest upon an ear of the user. But while the described embodiment is implemented using a pair of eyeglasses, it should be understood that such embodiments may be implemented using any structure that can be worn on the head of the user. For example, such structures may include headbands, hats, masks, and the like.

The immersive display eyewear 300 may include one or more outward-facing cameras 306. In the embodiment of FIG. 3, a camera 306 is mounted on a nose piece of the front 302. However, cameras may be mounted on other portions of the eyewear 300 in addition to, or instead of, this location. The camera 306 may include one or more devices for moving the camera such that a line of sight of the camera may be independent of the attitude of the front 302, as described in detail below. For example, these devices may include gimbals, motors, and the like. The camera may be implemented as a digital camera, or the like. However, any sort of camera capable of performing the functions described herein may be used.

The immersive display eyewear 300 may include one or more immersive micro-display panels 308. In the embodiment of FIG. 3, an immersive micro-display panel 308 is disposed within the resting line of sight of each eye of the user. Each immersive micro-display panel 308 may be implemented as a digital display panel, for example such as an LCD, LCOS, or OLED display panel. However, any sort of display panel capable of performing the functions described herein may be used. The immersive micro-display panels 308 may be transparent or occluded. In some embodiments, the immersive display eyewear 300 may include a user interface that allows the user to transition the immersive micro-display panels 308 between transparent and occluded states. In some embodiments, the immersive micro-display panels 308 may be fixedly coupled to the front 302.

In some embodiments, the immersive display eyewear 300 may include a controller 312. The controller 312 may receive images captured by the camera 306, and may provide these images to the immersive micro-display panels 308. The controller 312 may process the captured images prior to providing the processed imager to the immersive micro-display panels 308. For example, the controller 312 may magnify, brighten, or otherwise enhance the images. The controller 312 may control the movement of the movable camera 306. Some embodiments may comprise one or more sensors 314 such as tilt sensors, distance sensors, and the like. In such embodiments, the controller 312 may control the movement of the movable camera 306 in accordance with signals received from the sensors 314, for example as described in detail below. The controller 312 may be located within one of the temples 304, and/or within some other portion of the immersive display eyewear 300.

It should be appreciated that the embodiments of FIG. 3 may be used, wholly or partially, in conjunction with other embodiments described herein.

Figure 4:
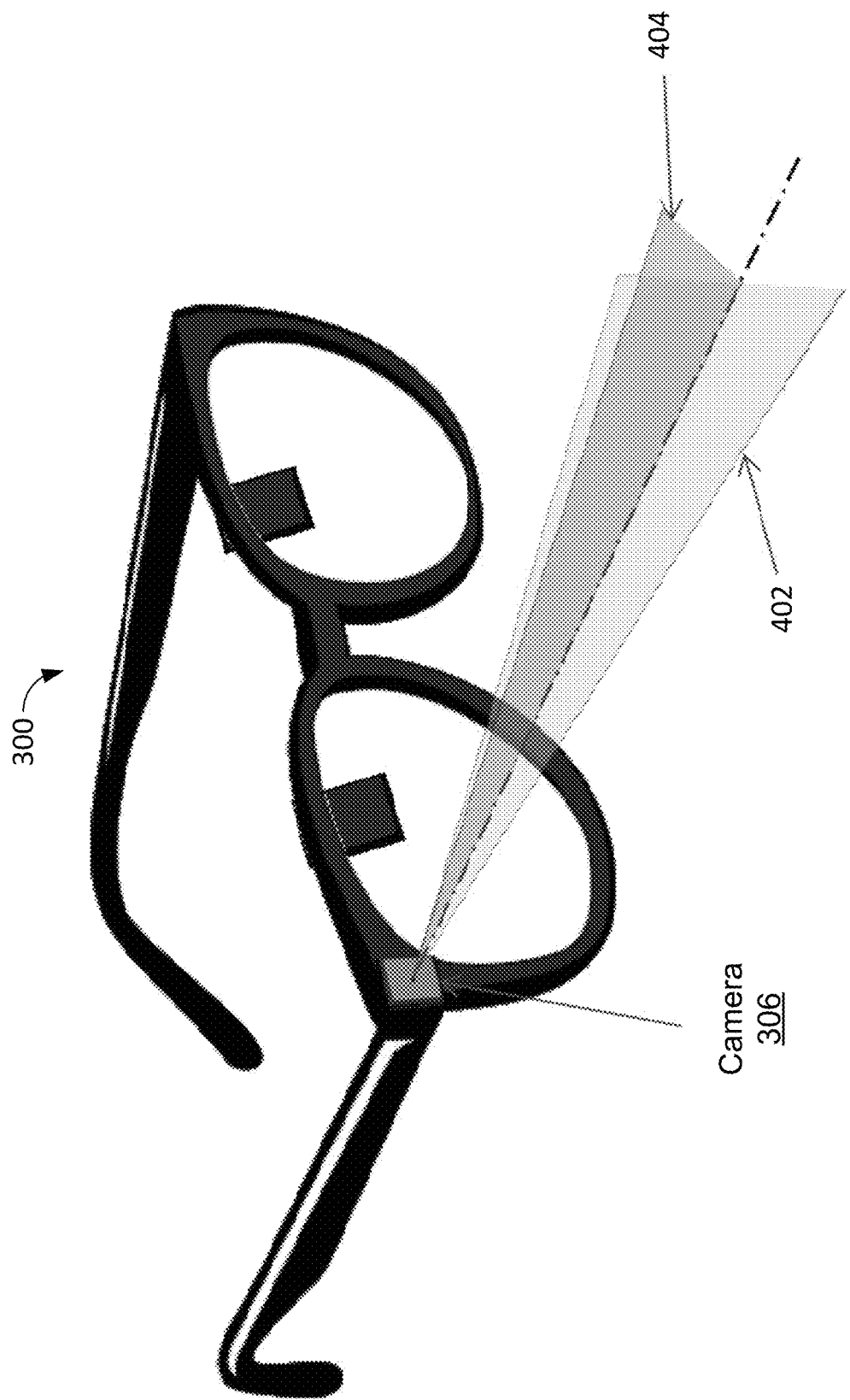
FIGS. 4 and 5 illustrate movements of the camera of FIG. 3 according to embodiments of the disclosed technology.
Figure 5:
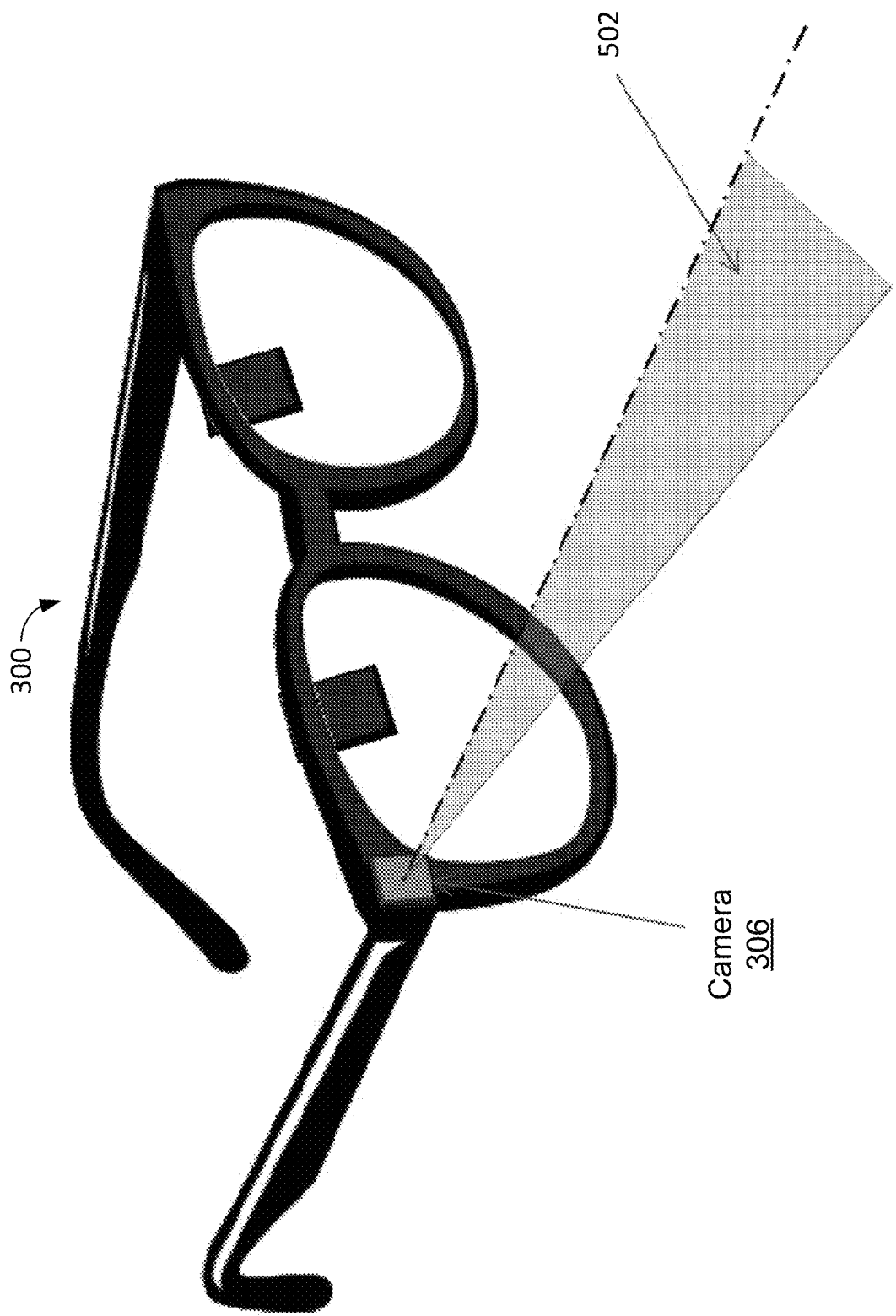

FIGS. 4 and 5 illustrate example movements of the camera 306 of FIG. 3 according to embodiments of the disclosed technology. In FIGS. 4 and 5, the camera 306 is mounted at an upper corner of the front of the display eyewear 300. However, the camera 306 may be mounted on other locations. Referring to FIG. 4, the camera 306 may angle the camera up and down in a vertical plane, as shown at 402. In addition, the camera 306 may angle the camera inward in a horizontal plane, as shown at 404. Referring to FIG. 5, the camera assembly may angle the camera outward in a horizontal plane, as shown at 502.

Figure 6:
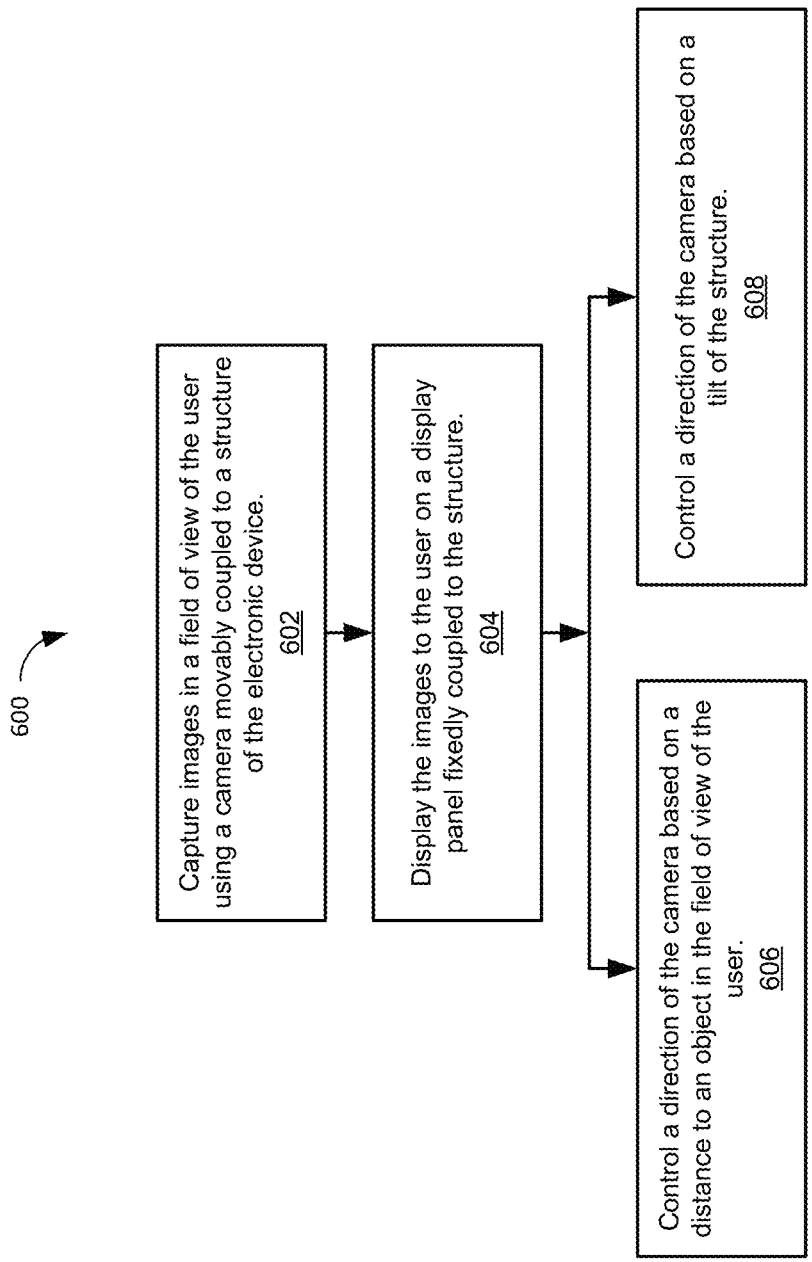
FIG. 6 illustrates a process for controlling the direction of the camera in display eyewear according to embodiments of the disclosed technology.

FIG. 6 illustrates a process 600 for controlling the direction of the camera in display eyewear according to embodiments of the disclosed technology. For example, the process 600 may apply to embodiments of the tip-down display eyewear 100 of FIG. 1 and the immersive display eyewear 300 of FIG. 3. In the process 600 of FIG. 6, the display eyewear is referred to as an electronic device. Although the disclosed processes are described in a particular sequence, it should be understood that one or more elements of each process may be performed in a different sequence and/or in parallel, and may be omitted or repeated.

Referring to FIG. 6, the process 600 may include capturing images in the field of view of the user using a camera movably coupled to a structure of the electronic device, at 602. In some embodiments of FIG. 1, the tip-down display eyewear 100 may capture images using a camera 106 that is movably coupled to the front 102 of the eyeglasses. In some embodiments of FIG. 3, the immersive display eyewear 300 may capture images using a camera 306 having a camera that is movably coupled to the front 302 of the eyeglasses.

Referring again to FIG. 6, the process 600 may include displaying the images to the user on a display panel fixedly coupled to the structure, at 604. In some embodiments of FIG. 1, one or more tip-down micro-display panels 108 fixedly coupled to the front 102 of the eyeglasses may display the captured images to the user. In some embodiments of FIG. 3, one or more immersive micro-display panels 308 fixedly coupled to the front 302 of the eyeglasses may display the captured images to the user.

Referring again to FIG. 6, in some embodiments, the process may include controlling a direction of the camera based on a distance to an object in the field of view of the user, at 606. In some embodiments of FIG. 1, the controller may control the direction of the camera 106 based on the distance to an object in the user's field of view, for example as detected by a distance sensor. In some embodiments of FIG. 3, the controller 312 may control the direction of the camera 306 based on the distance to an object in the user's field of view, for example as detected by a distance sensor.

Referring again to FIG. 6, in some embodiments, the process 600 may include controlling a direction of the camera based on a tilt of the structure, at 608. In some embodiments of FIG. 1, the controller 112 may control the direction of the camera 106 based on the tilt of the eyeglasses, for example as detected by a tilt sensor. In some embodiments of FIG. 3, the controller 312 may control the direction of the camera in the camera 306 based on the tilt of the eyeglasses, for example as detected by a tilt sensor. In some embodiments, the camera may be disposed above a resting line of sight of the user, and controlling the camera may include causing an angle between a line of sight of the camera and a resting line of sight of the user to increase with increasing tilt, for example as described below in the example use case of FIG. 7A through 7C.

Figure 7C:
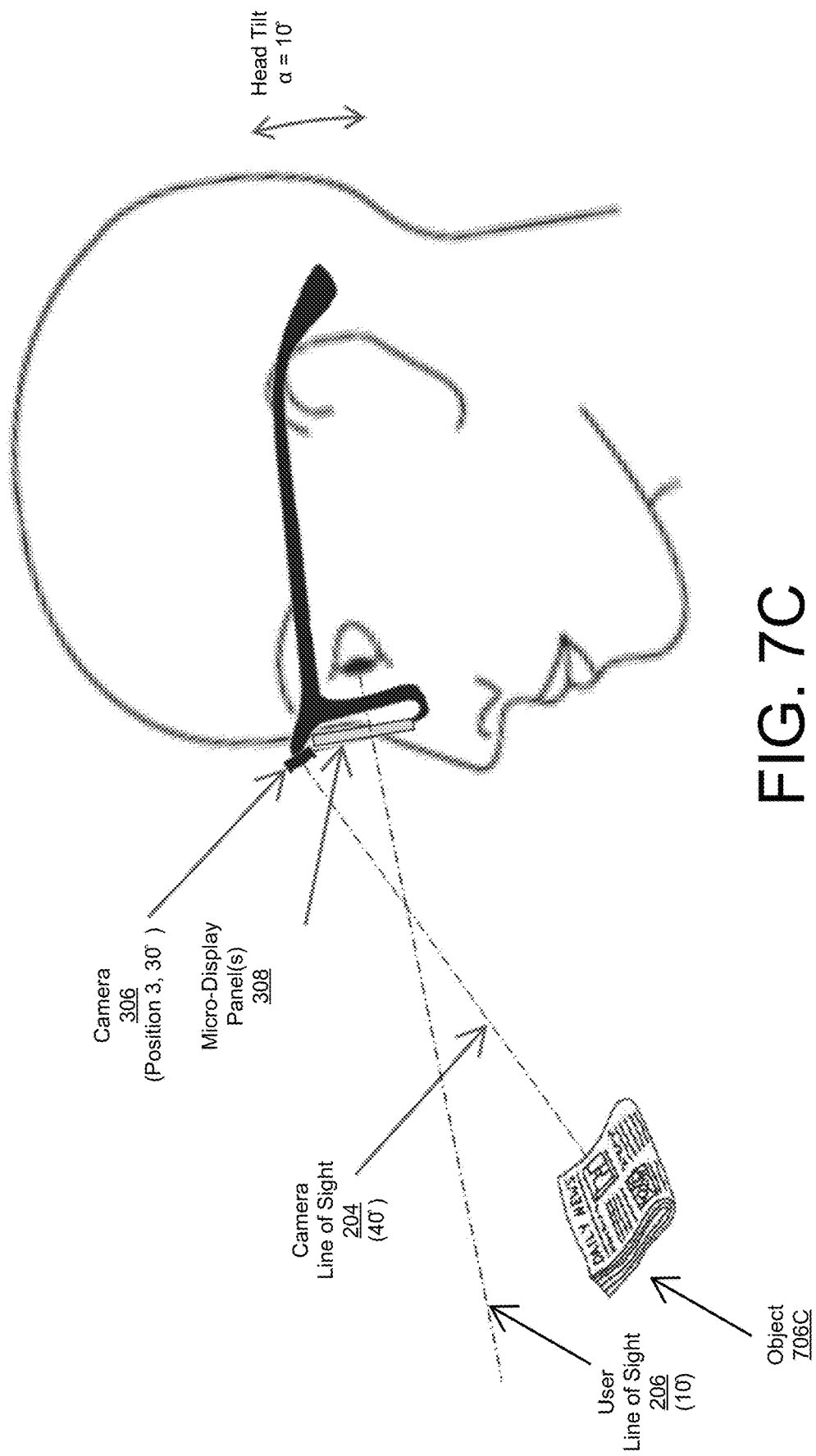

FIGS. 7A through 7C illustrate a use case for immersive display eyewear controlling movement of the camera based on head tilt according to embodiments of the disclosed technology. For clarity, this use case is described with reference to the immersive display eyewear 300 of FIG. 3. However, it should be understood that this use case applies to other embodiments as well. In these examples, the display eyewear is programmed with the plurality of preset camera angles or positions, each corresponding to a head tilt angle or range of angles. Other embodiments may employ different methods of setting camera angle based on the head tilt. For example, the camera angle may be calculated as a continuous function of head tilt angles.

Referring to FIG. 7A, a user employs the eyewear 300 with a resting head angle and a resting line of sight 206 ($\alpha=0°$) to view an object 706A, such as a bird perched upon a branch. In these examples, the camera 306 is mounted above a user line of sight 206, and responsive to the user head tilt being $\alpha=0°$, is moved to a first position (Position 1), where the camera 306 is angled down at 2°, to produce a camera line of sight 204 of 2° down, thereby causing the user line of sight 206, and the camera line of sight 204, to intersect at the object 706A. This intersection allows the user to acquire the image of the object 208 in an intuitive and seamless manner.

Referring to FIG. 7B, the user employs the eyewear 300 to view an object 706B, for example such as a computer, at a medium distance. In this example, the user employs a downward head tilt of $\alpha=5°$, and a downward user line of sight 206 of 10°. Responsive to detecting the head tilt of $\alpha=5°$, the eyewear 300 moves the camera 306 to a second position (Position 2), where the camera 306 is angled down at 15°, to produce a camera line of sight 204 of 20° down, thereby causing the user line of sight 206, and the camera line of sight 204, to intersect at the object 706B.

Referring to FIG. 7C, the user employs the eyewear 300 to view an object 706C, for example such as a newspaper, at a close distance. In this example, the user employs a downward head tilt of $\alpha=10°$, and a downward user line of sight 206 of 10°. Responsive to detecting the head tilt of $\alpha=10°$, the eyewear 300 moves the camera 306 to a third position (Position 3), where the camera 306 is angled down at 30°, to produce a camera line of sight 204 of 40° down, thereby causing the user line of sight 206, and the camera line of sight 204, to not intersect at the object 706C.

Some embodiments perform electronic image shifting. In some embodiments, electronic image shifting is employed to shift images that may be only partially displayed so that they are fully displayed. In some embodiments, electronic image shifting is employed to shift images from one portion of the display to another, for example to assist users having hemianopsia or similar conditions. In any of these embodiments, the camera may feature a wide-angle lens to provide a larger camera field of view.

Figure 8:
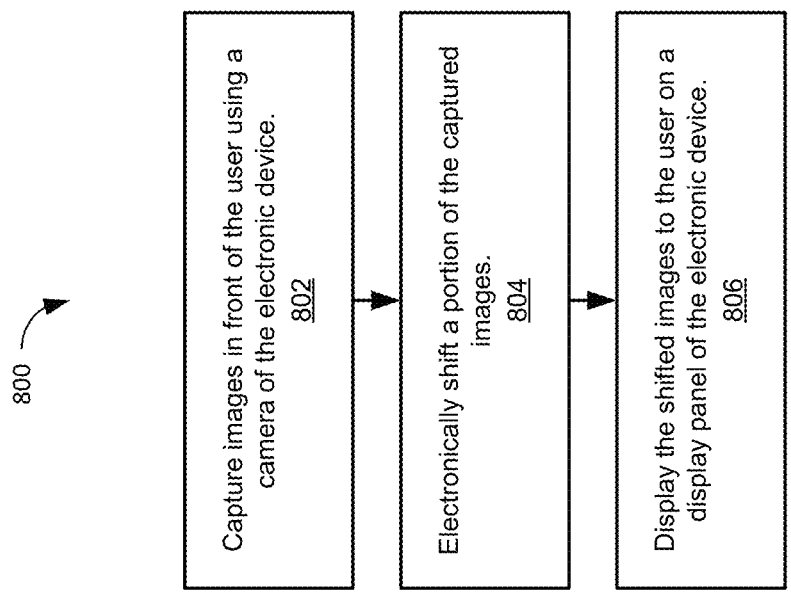
FIG. 8 illustrates a process for electronic image shifting according to some embodiments of the disclosed technology.

FIG. 8 illustrates a process 800 for electronic image shifting according to some embodiments of the disclosed technology. In FIG. 8, the process 800 is described in terms of an electronic device configured to be worn on the head of a user. Referring to FIG. 8, the process may include capturing images in front of the user using a camera of the electronic device, at 802. In some embodiments of FIG. 1, the camera 106 of the tip-down display eyewear 100 may capture images in front of the user. In some embodiments of FIG. 3, the camera of the camera 306 of the immersive display eyewear 300 may capture images in front of the user.

Referring again to FIG. 8, the process 800 may include electronically shifting all or a portion of the captured images, at 804. In some embodiments of FIG. 1, the controller 112 of the tip-down display eyewear 100 may electronically shift all or a portion of the images captured by the camera 106. In some embodiments of FIG. 3, the immersive display eyewear 300 may electronically shift all or a portion of the images captured by the camera 306.

Referring again to FIG. 8, the process 300 may include displaying the shifted images to the user on a display panel of the electronic device, at 806. In some embodiments of FIG. 1, the tip-down micro-display panels 108 may display the shifted images to the user. In some embodiments of FIG. 3, the immersive display panels 308 may display the shifted images to the user.

Figure 9A:
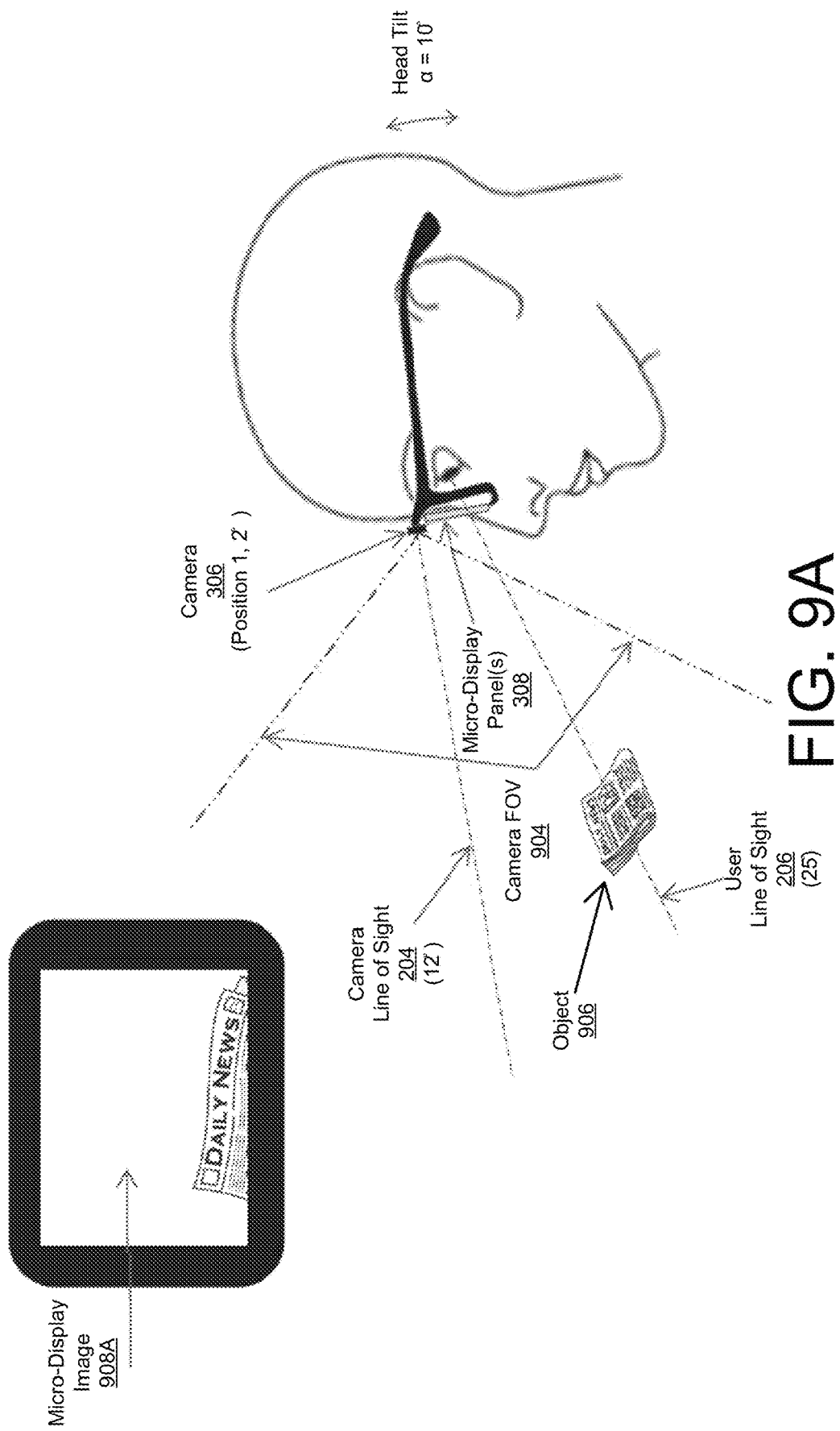
FIGS. 9A and 9B illustrate a use case where electronic image shifting is employed to shift images that are only partially displayed so as to be more fully displayed to the user.
Figure 9B:
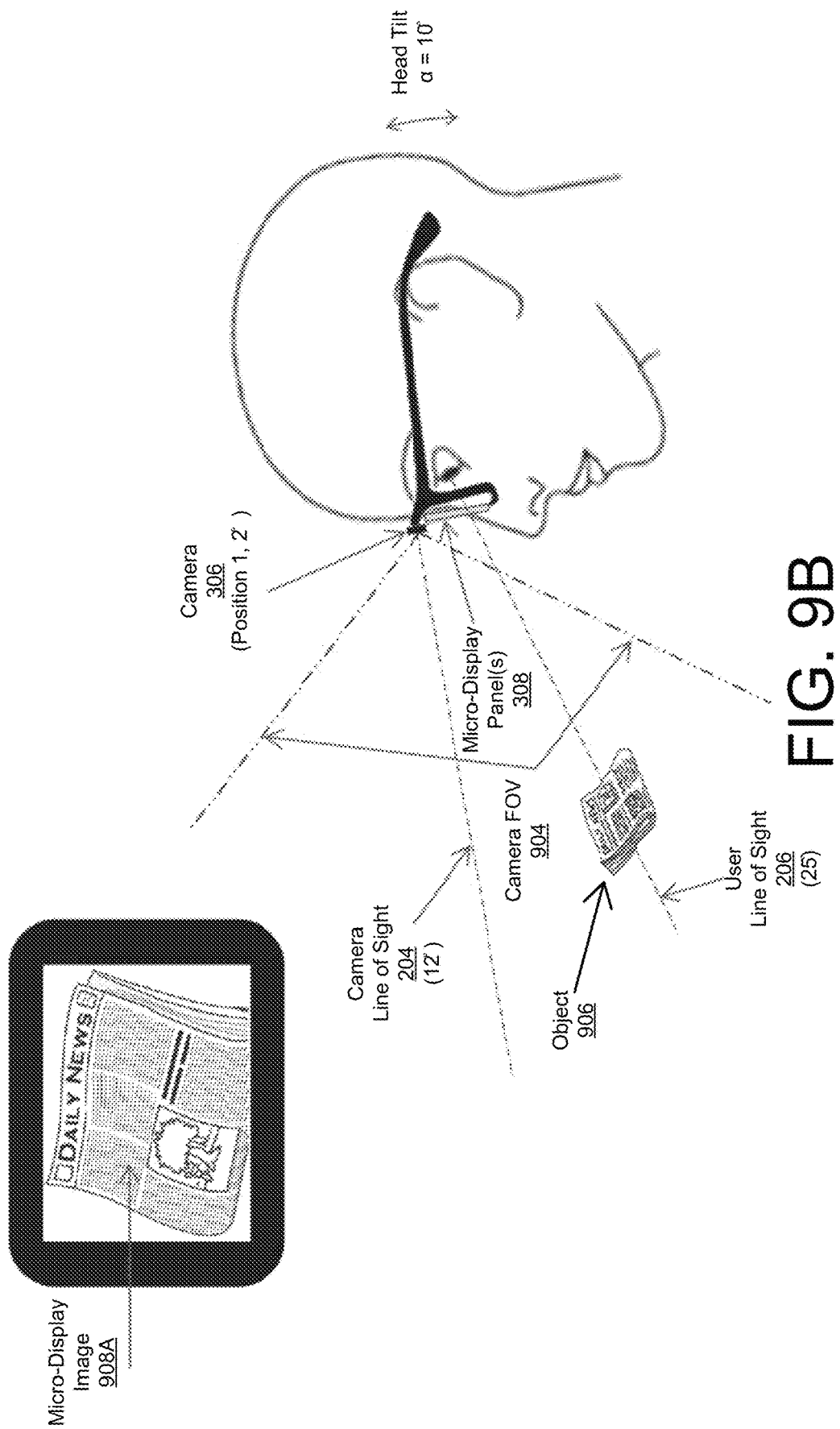

FIGS. 9A and 9B illustrate a use case where electronic image shifting is employed to shift images that are only partially displayed so as to be more fully displayed to the user. For clarity, this use case is described with reference to the immersive display eyewear 300 of FIG. 3. However, it should be understood that this use case applies to other embodiments as well, for example including display eyewear with fixed cameras.

Referring to FIG. 9A, a user gazes at an object 906, such as a newspaper, through transparent micro-display panels 308. But while the user line of sight 206 is 25° down, the camera line of sight 204 is only 12° down. Therefore, although the camera field of view (FOV) completely encompasses the newspaper 906, only a portion of the newspaper 906 is displayed to the user by the micro-display panels 308, as illustrated at 908A. The display eyewear 300 may detect this condition using any technique. For example, the display eyewear 300 may detect this condition by measuring the angle between the user line of sight 206 and the camera line of sight 204. As another example, the display eyewear 300 may detect this condition by analyzing the images captured by the camera 306.

Referring to FIG. 9B, the display eyewear 300 has shifted the image of the newspaper 906 so as to be more fully displayed to the user, as shown at 908B. The disclosed embodiments are independent of the technique employed to shift the images. Any image shifting technique may be used.

Figure 10A:
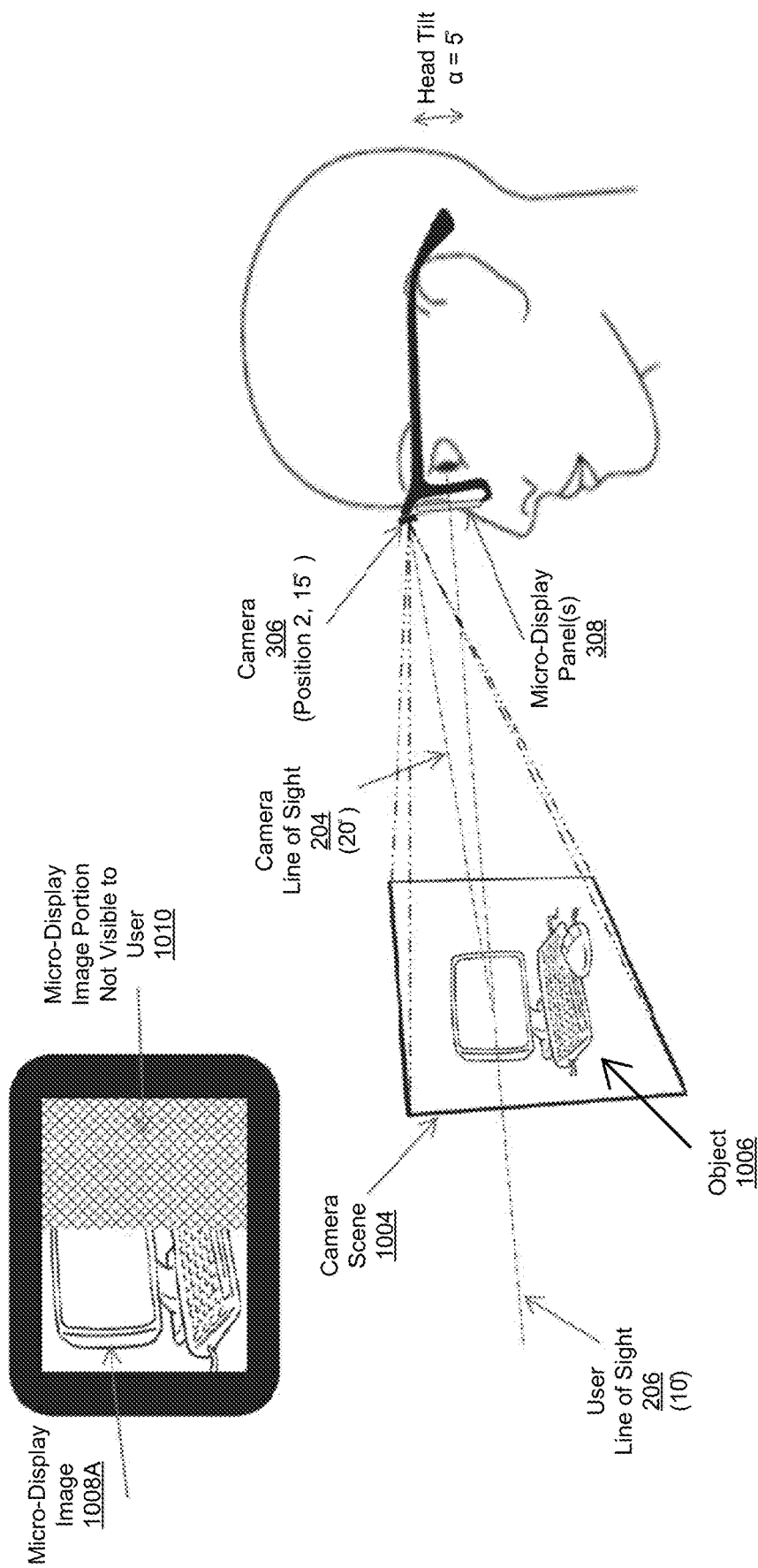
FIGS. 10A and 10B illustrate a use case where electronic image shifting is employed to shift images from one portion of the display to another.
Figure 10B:
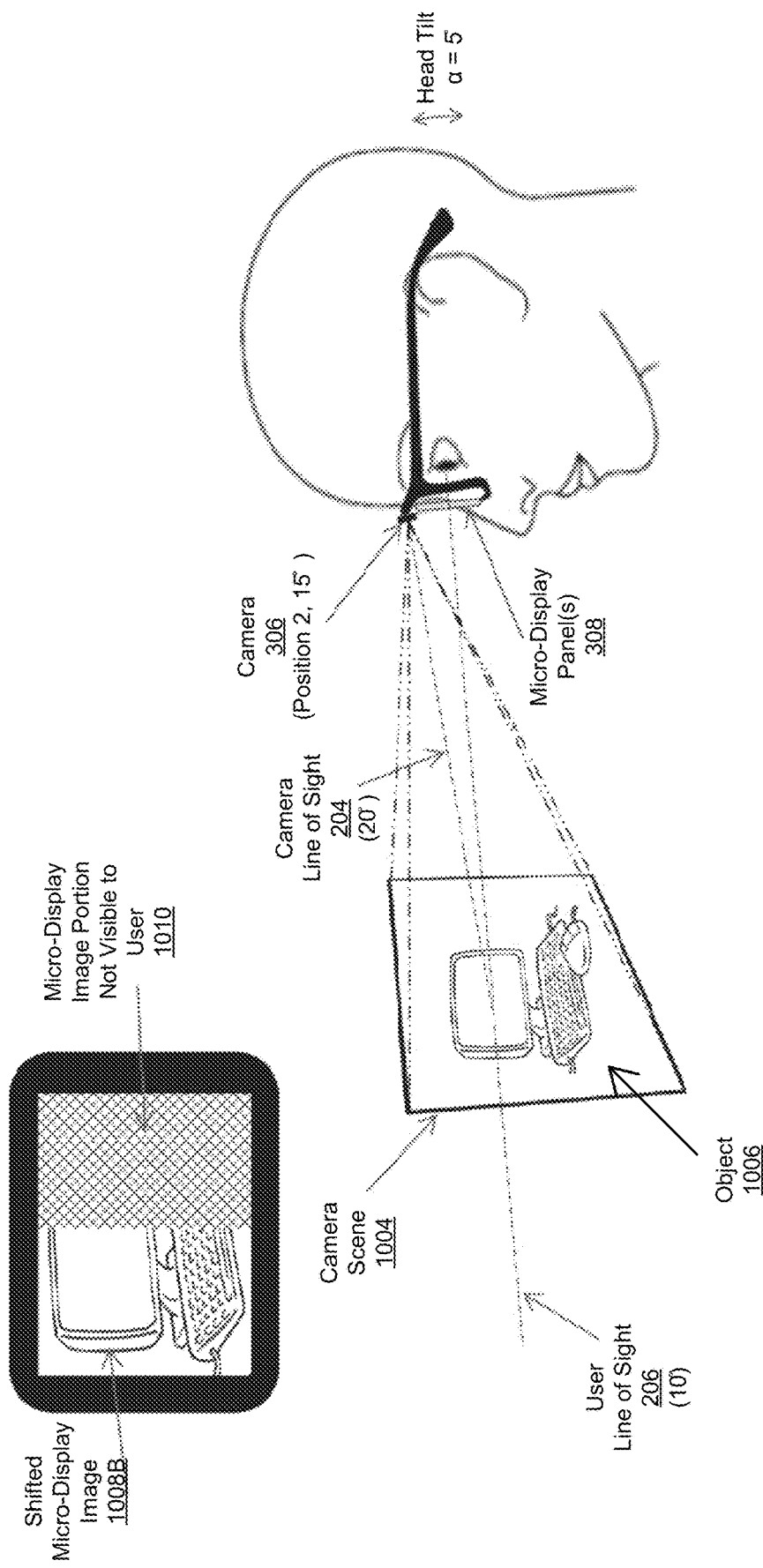

FIGS. 10A and 10B illustrate a use case where electronic image shifting is employed to shift images from one portion of the display to another. For clarity, this use case is described with reference to the tip-down display eyewear 300 of FIG. 3. However, it should be understood that this use case applies to other embodiments as well.

Referring to FIG. 10A, the user directs their head toward an object, such as a computer, while wearing occluded micro-display panels 308. In addition, the camera 306 is properly positioned to capture a full image of the computer 1006, as illustrated by the camera scene 1004. However, the user can only see the left side of the image, at 1008A, while the right portion of the image is not visible to the user, at 1010. This situation may occur for a user with vision conditions such as a right hemianopsia.

Referring to FIG. 10B, the display eyewear 300 has shifted the right portion of the image to the left side of the display, at 1008B, allowing the user to view the right side of the computer 1006. The disclosed shifting techniques are not limited to the image shifts described herein. It should be understood that various embodiments may shift images in any direction, may perform multiple shifts, for example to divide or relocate an image to avoid central blind spot, and the like.

Figure 11B:
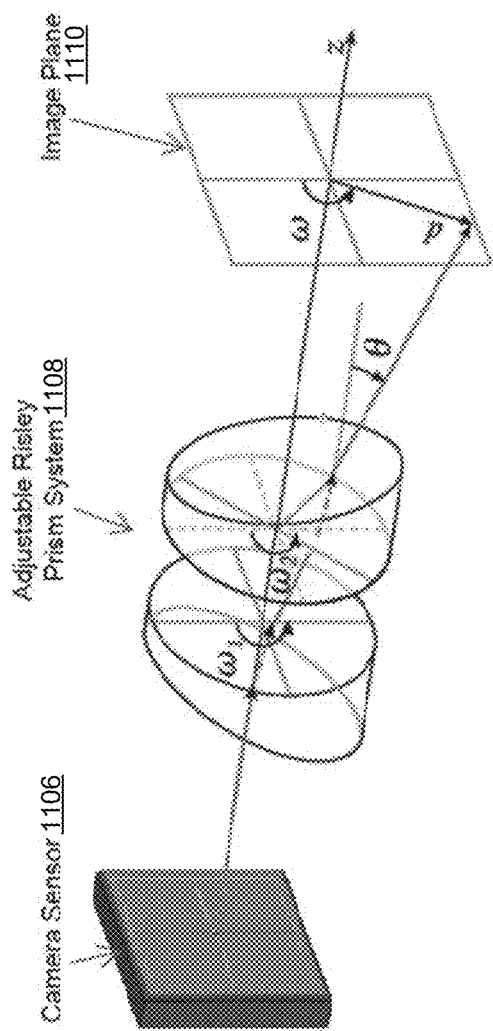
FIGS. 11A,B illustrate an optical image shifting image system according to some embodiments of the disclosed technology.
Figure 11A:
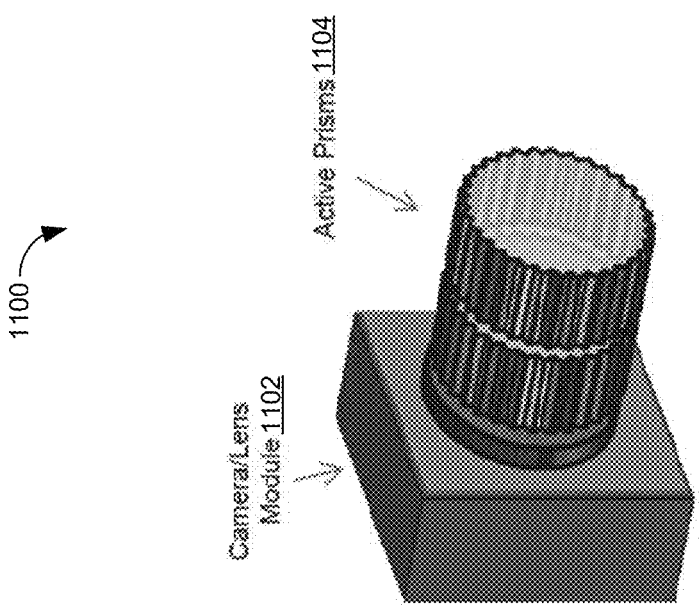

Some embodiments provide optical image shifting. FIGS. 11A,B illustrate an optical image shifting image system 1100 according to some embodiments of the disclosed technology. The optical image shifting system 1100 can be implemented in any camera in any embodiment of the disclosed technology.

Referring to FIG. 11A, the optical image shifting image system 1100 may include a camera/lens module 1102 and active prisms 1104. Referring to FIG. 11B, the camera/lens module 1102 may include a camera sensor 1106, and the active prisms 1104 may include an adjustable Risley prism system 1108.

The optical image shifting image system 1100 may include two Risley prisms, which can be rotated at angles $\omega_1$ and $\omega_2$, respectively. The Risley prisms may be rotated to achieve a desired deflection θ and direction ω of the light. The angle θ may be controlled by controlling the relative angle between the two prisms, that is, the difference between angles $\omega_1$ and $\omega_2$. The direction ω of the light may be controlled by rotating the Risley prisms together. The distance d is controlled by the angle θ and the distance to the image plane 1110.

Figures 12A, 12B:
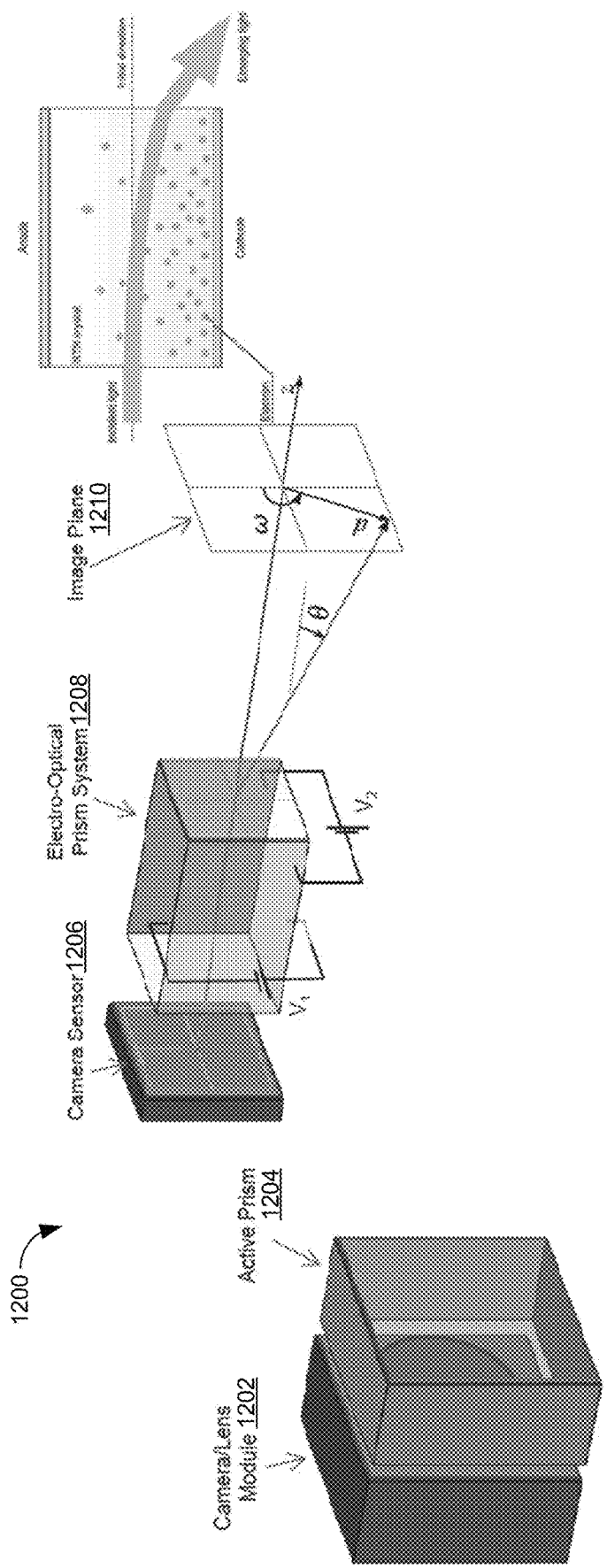
FIGS. 12A,B illustrate an electro-optical image shifting image system according to some embodiments of the disclosed technology.

Some embodiments provide electro-optical image shifting. FIGS. 12A,B illustrate an electro-optical image shifting system 1200 according to some embodiments of the disclosed technology. The electro-optical image shifting system 1200 can be implemented in any camera in any embodiment of the disclosed technology.

Referring to FIG. 12A, the electro-optical image shifting image system 1200 may include a camera/lens module 1202 and active prism 1204. Referring to FIG. 12B, the camera/lens module 1202 may include a camera sensor 1206, and the active prism 1204 may include an electro-optical prism system 1208. The electro-optical prism system 1208 may include two pairs of opposed anodes and cathodes, between which incident light is directed toward the camera sensor 1206. The opposed anodes and cathodes are depicted as a horizontal pair and a vertical pair. However, it should be understood that other arrangements are contemplated. A voltage $V_1$ may be applied to the horizontal anode and cathode to deflect the incident light vertically. A voltage $V_2$ may be applied to the vertical anode and cathode to deflect the incident light horizontally. The magnitudes and polarities of the voltages may be adjusted to achieve a desired deflection θ and direction ω of the light. The angle θ may be proportional to the magnitude of the voltages applied. The distance d is controlled by the angle θ and the distance to the image plane 1210.

Some embodiments provide resolution of Vergence-Accommodation Conflict (VAC), which is now described. We see the world in three dimensions primarily by way of an unconscious triangulation in our brain using the slightly different perspectives of our two eyes. Our two eyes rotate towards each other (vergence) until we achieve binocular fusion, where corresponding parts of the two images captured by our eyes line up, and the two views merge into a single three-dimensional view. But we also sense the third dimension by the change in eye focus to make an object look sharp (accommodation) and by moving our eyes around the scene and noting how objects are occluded by other parts of the scene (parallax) as well as by the shading of the scene. If the ways of sensing 3D are consistent with each other, the depth cues 'feel' natural. But if the depth cues are not consistent across the various methods of sensing 3D, it can cause anything from mild discomfort to dizziness, headaches, and nausea.

In virtual environment systems, for example such as virtual reality systems, the primary method for displaying 3D content is based on stereo vision. Two views of a scene with the proper offset perspectives (binocular disparity) are presented, one to each eye. The two eyes verge until binocular fusion is achieved and a 3D view appears. 3D depth is contained in the amount by which the perspective of various parts of the scene shift between the two views, that is, by the amount by which the eyes need to verge in order to fuse the two images. Close objects require strong vergence while distant objects may need no vergence.

The effect is impressive and convincing, and can create scenes with a full range of visual depth. But after a while, this sensation becomes uncomfortable because the 3D effect is based solely on vergence. The left and right eye displays are fixed at an actual distance in physical space, and therefore the eyes must be focused (accommodated) to that distance to see them clearly. This gives rise to the Vergence-Accommodation Conflict (VAC) because the 3D cues from vergence and accommodation are not consistent. The binocular content causes the eyes to verge according to the varying 3D position, while the fixed position of the displays forces the eyes to accommodate to the display distance. FIGS. 13A and 13B show the difference in viewing paradigms between normal viewing of an object in reality (FIG. 13A), and when viewing a virtual environment (VE) on a head-mounted display (HMD) (FIG. 13B). In reality, the vergence distance and accommodative distance are the same (FIG. 13A), so human vision operates with the two oculomotor adjustments neurally coupled, where a change in vergence automatically stimulates a corresponding change in accommodation and vice-versa. But in VE the distances differ (FIG. 13B), resulting in VAC, a conflict in the hard-wired human visual response.

Figure 14:
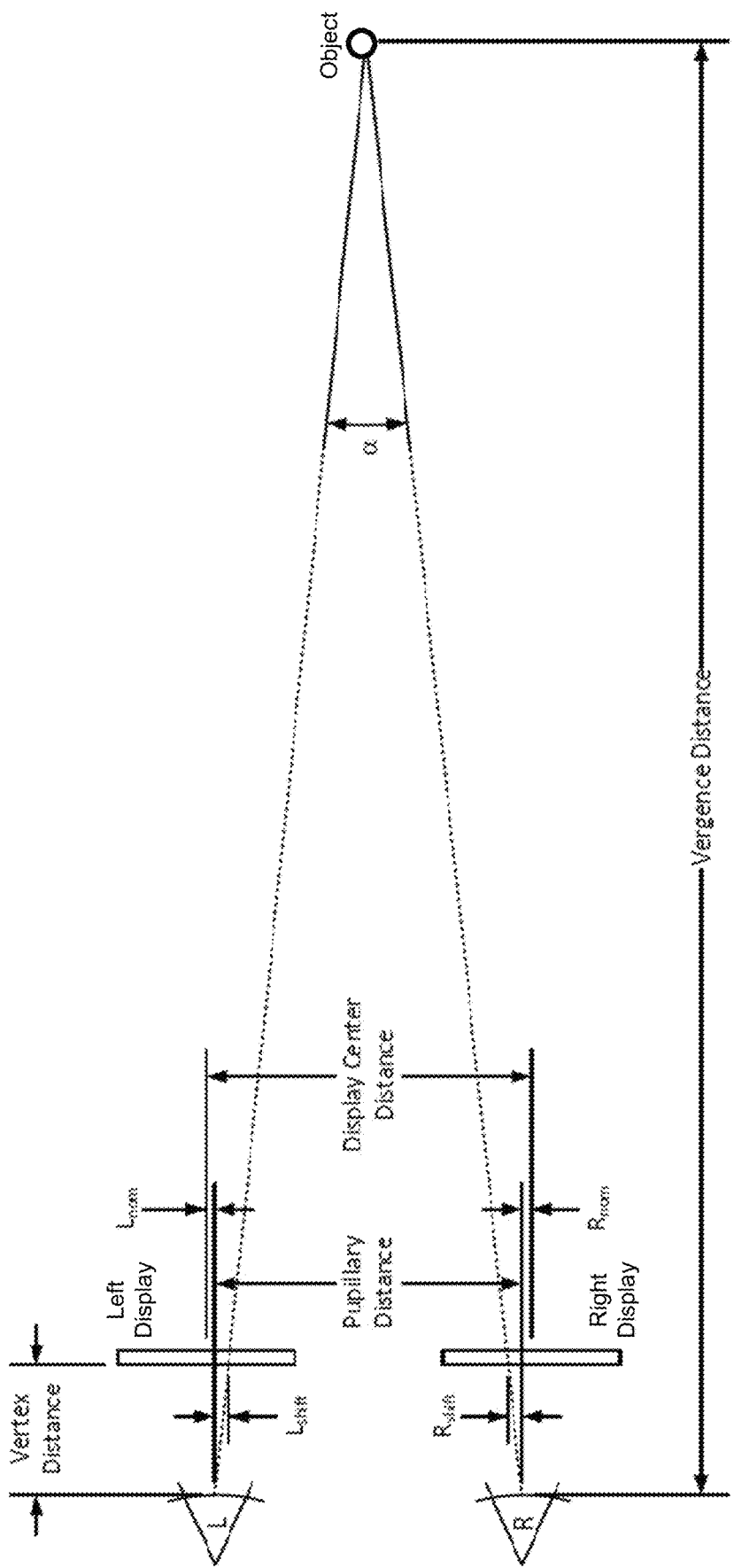
FIG. 14 illustrates image shifting as a function of vergence distance.

To resolve VAC, some embodiments employ image shifting as a function of vergence distance, as illustrated in FIG. 14. Two methods are described. In the first method, referred to herein as the iOptik® method, the user wears special contact lenses, such as those disclosed in U.S. Pat. Nos. 8,142,016, 8,888,279, and 9,874,765, all entitled "Method and Apparatus for Constructing a Contact Lens with Optics," the disclosures thereof incorporated by reference herein in their entireties for all purposes. In the iOptik® method, pixel size may be estimated using physical display parameters and resolution. In the second method, referred to herein as the "alternate" method, pixel size may be estimated using display field angles and resolution. In both methods, the image shifting is expressed in terms of pixels. For clarity, the methods are described using example values for the variables. However, it should be understood that any values may be used.

Referring to FIG. 14, the following variables are defined:
Display Center Distance DCD:=64 mm
Pupillary Distance PD:=61 mm
Vertex Distance $VD_1$:=14 mm $VD_2$:=2.0 m
Display Resolution $H_{pixel}$:=1920 $H_{pixel}$:=1080

In these examples, both methods deal with the same display field of view to allow for direct comparisons between the methods. Condition 1 is computed for the iOptik® method, denoted by the subscript (1), while Condition 2 is computed for the alternate method, denoted by the subscript (2). For the iOptik® method, the following parameters are defined:

Display Physical Size $H$:=15.5 mm $V$:=8.72 mm

Estimated Pixel Size $pixel_1 := \frac{H}{H_{pixel}} = 8.073 \ \mu m$

For the alternate method, the following parameters are defined:

Display Field Size $H_{FOV}$:=47.9 deg $V_{FOV}$:= 34.6 deg

Estimated Pixel Size $pixel_2 := \frac{H_{FOV}}{H_{pixel}} \cdot VD_2 = 870.8 \ \mu m$ Alignment with the user pupillary distance and the vergence distance is computed by:

$$Shift = \frac{DCD - PD}{2 \cdot pixel} + \frac{VD \cdot \left(\frac{PD}{2 \cdot d}\right)}{pixel}$$

In the iOptik® method, the pixel shift for a single eye is given by:

$$Shift_1 := \frac{DCD - PD}{2 \cdot pixel_1} + \frac{VD \cdot \left(\frac{PD}{2 \cdot d}\right)}{pixel_1}$$

For a vergence distance of d:=100 m, this equates to 186 pixels, for a vergence distance of d:=10 m, this equates to 191 pixels, for a vergence distance of d:=1 m, this equates to 239 pixels, and for a vergence distance of d:=0.4 m, this equates to 318 pixels.

In the alternate method, the pixel shift for the left eye is given by:

$$Shift_2 := \frac{DCD - PD}{2 \cdot pixel_2} + \frac{VD \cdot \left(\frac{PD}{2 \cdot d}\right)}{pixel_2}$$

For a vergence distance of d:=100 m, this equates to 2 pixels, for a vergence distance of d:=10 m, this equates to 9 pixels, for a vergence distance of d:=1 m, this equates to 72 pixels, and for a vergence distance of d:=0.4 m, this equates to 177 pixels.

Figure 15:
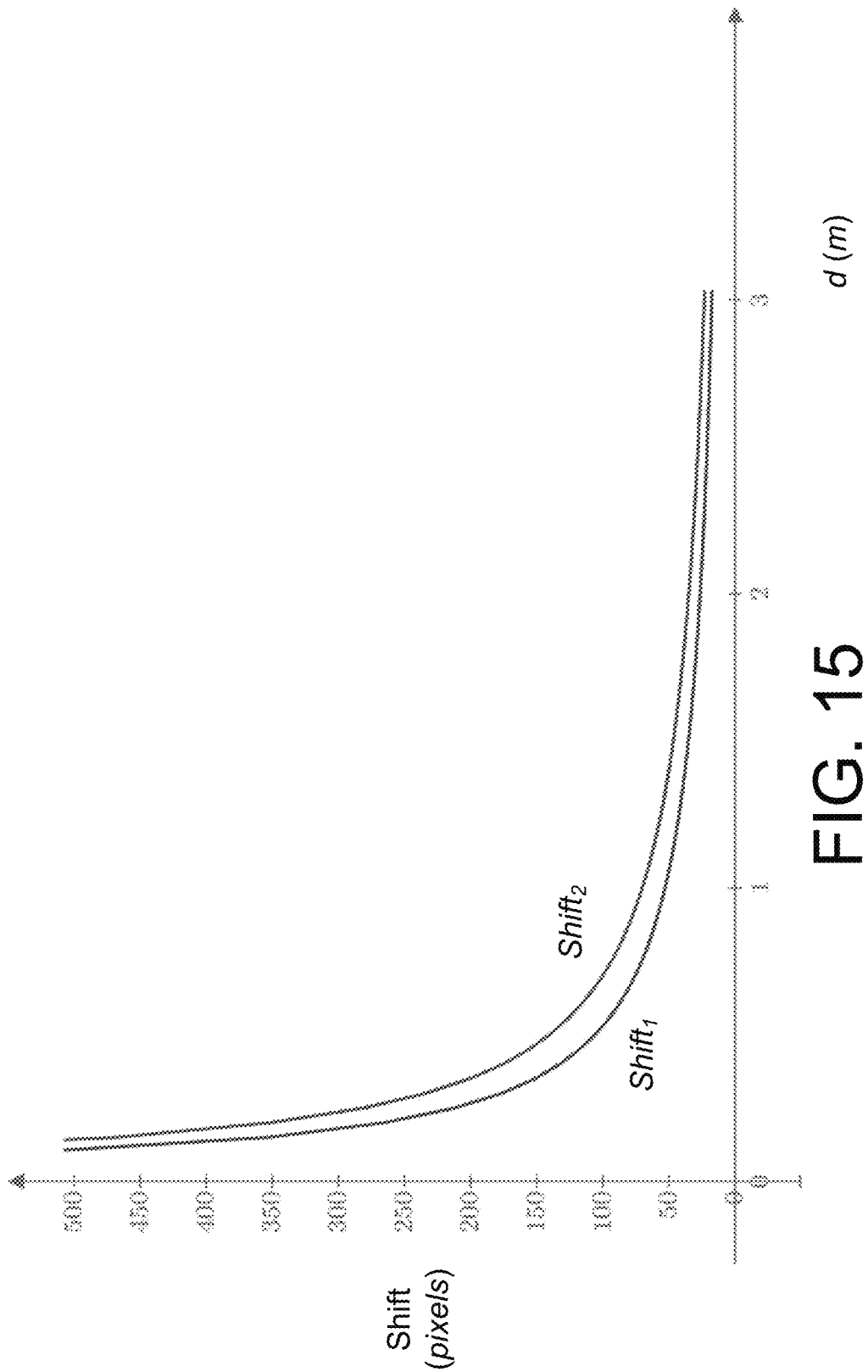
FIG. 15 shows a plot of image shifts in pixels for different values of the vergence distance d in meters.

FIG. 15 shows a plot of image shifts in pixels for different values of the vergence distance d in meters.

The iOptik® method provides the ability for the user to accommodate their focus to match the vergence demand and still achieve a focused digital image. With image shifting and focus tolerance to align with user's most comfortable gaze angle, head angle, and vergence demand, the iOptik® method provides a much preferred eyewear solution.

The ability for traditional (alternate) methods to allow for focus change has not been achieved in other systems, although there are claims of "light field displays" and other techniques to manage the problem. Because those systems cannot tolerate a focus change by the user, the shift of the images to align with vergence demand requires the user to fight the neurally coupled synchronous focal demand, which subsequently leads to the complaints described above. Thus, other systems have not yet implemented image shifting for this purpose.

Figure 16:
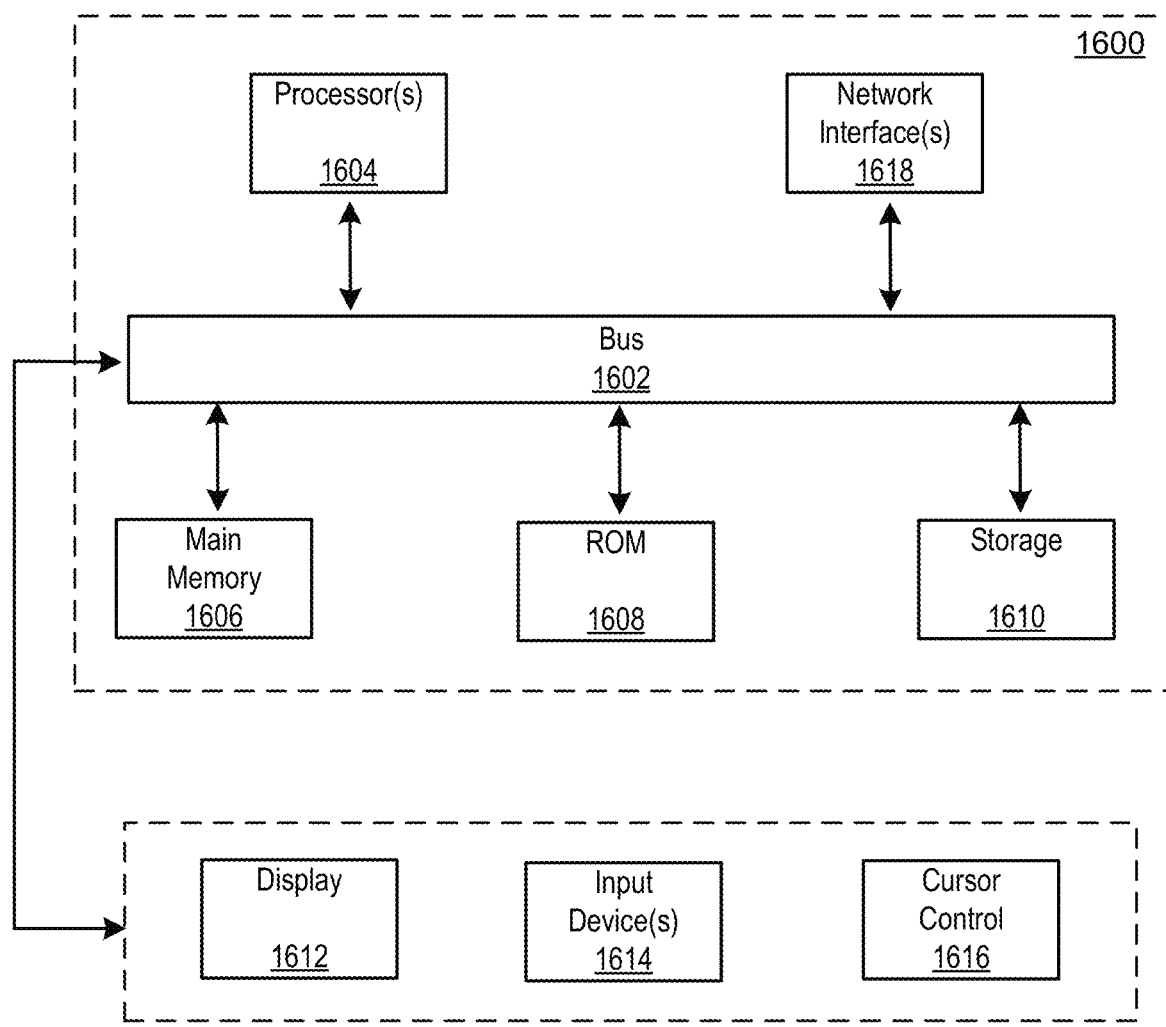
FIG. 16 is an example computing component that may be used to implement various features of embodiments described in the present disclosure.

FIG. 16 depicts a block diagram of an example computer system 1600 in which embodiments described herein may be implemented. The computer system 1600 includes a bus 1602 or other communication mechanism for communicating information, one or more hardware processors 1604 coupled with bus 1602 for processing information. Hardware processor(s) 1604 may be, for example, one or more general purpose microprocessors.

The computer system 1600 also includes a main memory 1606, such as a random access memory (RAM), cache and/or other dynamic storage devices, coupled to bus 1602 for storing information and instructions to be executed by processor 1604. Main memory 1606 also may be used for storing temporary variables or other intermediate information during execution of instructions to be executed by processor 1604. Such instructions, when stored in storage media accessible to processor 1604, render computer system 1600 into a special-purpose machine that is customized to perform the operations specified in the instructions.

The computer system 1600 further includes a read only memory (ROM) 1608 or other static storage device coupled to bus 1602 for storing static information and instructions for processor 1604. A storage device 1610, such as a magnetic disk, optical disk, or USB thumb drive (Flash drive), etc., is provided and coupled to bus 1602 for storing information and instructions.

The computer system 1600 may be coupled via bus 1602 to a display 1612, such as a liquid crystal display (LCD) (or touch screen), for displaying information to a computer user. An input device 1616, including alphanumeric and other keys, is coupled to bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. In some embodiments, the same direction information and command selections as cursor control may be implemented via receiving touches on a touch screen without a cursor.

The computing system 1600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1600 may implement the techniques described herein using customized hard-wired logic, one or more ASICs or FPGAs, firmware and/or program logic which in combination with the computer system causes or programs computer system 1600 to be a special-purpose machine. According to one embodiment, the techniques herein are performed by computer system 1600 in response to processor(s) 1604 executing one or more sequences of one or more instructions contained in main memory 1606. Such instructions may be read into main memory 1606 from another storage medium, such as storage device 1610. Execution of the sequences of instructions contained in main memory 1606 causes processor(s) 1604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1610. Volatile media includes dynamic memory, such as main memory 1606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1602. Transmission media can also take the form of acoustic or light waves, such as those generated during radio-wave and infra-red data communications.

The computer system 1600 also includes a communication interface 1618 coupled to bus 1602. Network interface 1618 provides a two-way data communication coupling to one or more network links that are connected to one or more local networks. For example, communication interface 1618 may be an integrated services digital network (ISDN) card, cable modem, satellite modem, or a modem to provide a data communication connection to a corresponding type of telephone line. As another example, network interface 1618 may be a local area network (LAN) card to provide a data communication connection to a compatible LAN (or a WAN component to communicate with a WAN). Wireless links may also be implemented. In any such implementation, network interface 1618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1618, which carry the digital data to and from computer system 1600, are example forms of transmission media.

The computer system 1600 can send messages and receive data, including program code, through the network(s), network link and communication interface 1618. In the Internet example, a server might transmit a requested code for an application program through the Internet, the ISP, the local network and the communication interface 1618.

The received code may be executed by processor 1604 as it is received, and/or stored in storage device 1610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An electronic device, comprising:
   a structure configured to be worn on the head of a user;
   a camera non-rotatably coupled to the structure and configured to capture images in the field of view of the user;
   a pair of display panels coupled to the structure; and
   a controller configured to electronically shift a portion of the captured images by a number of pixels determined according to a vergence distance between eyes of the user and an object in the field of view of the user, a display center distance between centers of the displays, a pupillary distance between pupils of the user, a vertex distance between the pupils of the user and the display panels, and an estimated pixel size of the display panels;
   wherein the pair of display panels is configured to display, to the user, the shifted images.

2. The electronic device of claim 1, wherein:
   a field of view displayed by the display panels is smaller than a field of view captured by the camera; and
   the controller is further configured to shift a portion of the captured images from outside the field of view of the display panels to within the field of view of the display panels.

3. The electronic device of claim 2, wherein:
   an angle of the shift exceeds 10°.

4. The electronic device of claim 2, wherein:
   an angle of the shift is a fixed angle.

5. The electronic device of claim 2, further comprising:
   a user input device, wherein an angle of the shift is determined by inputs received by the user input device.

6. The electronic device of claim 1, wherein:
   the controller is further configured to shift a portion of the captured images prior to displaying the captured images.

7. The electronic device of claim 1, wherein the structure comprises at least one of:
   a frame configured to be worn on the head of a user, the frame including a nose rest configured to rest on the nose of the user, and an ear rest configured to rest on an ear of the user; and
   a frame front.

8. The electronic device of claim 1, wherein the display panels are occluded or transparent.

9. The electronic device of claim 1, wherein the controller is configured to electronically shift the portion of the captured images horizontally.

10. The electronic device of claim 1, wherein the controller is configured to electronically shift the portion of the captured images vertically.

11. A non-transitory machine-readable storage medium encoded with instructions executable by one or more hardware processors of an electronic device configured to be worn on the head of a user, the machine-readable storage medium comprising instructions to cause the one or more hardware processors to perform operations comprising:
   capturing images in a field of view of the user using a camera non-rotatably coupled to the electronic device and configured to capture images in the field of view of the user;
   displaying the captured images to the user on a pair of display panels coupled to the electronic device within a resting line of sight of the user;

electronically shifting a portion of the captured images by a number of pixels determined according to a vergence distance between eyes of the user and an object in the field of view of the user, a display center distance between centers of the displays, a pupillary distance between pupils of the user, a vertex distance between the pupils of the user and the display panels, and an estimated pixel size of the display panels; and wherein displaying the captured images to the user comprises displaying the shifted images to the user on the display panels.

12. The storage medium of claim 11, wherein the electronic device comprises at least one of:

a frame configured to be worn on the head of a user, the frame including a nose rest configured to rest on the nose of the user, and an ear rest configured to rest on an ear of the user; and a frame front.

13. The storage medium of claim 11, wherein the display panels are occluded or transparent.

14. The storage medium of claim 11, wherein electronically shifting the portion of the captured images comprises:

electronically shifting the portion of the captured images vertically.

15. The storage medium of claim 11, wherein electronically shifting the portion of the captured images comprises:

electronically shifting the portion of the captured images horizontally.

* * * * *